(12) United States Patent
Furukawa et al.

(10) Patent No.: US 11,437,198 B2
(45) Date of Patent: Sep. 6, 2022

(54) METHOD FOR PRODUCING SOLID ELECTROLYTIC CAPACITOR, AND SOLID ELECTROLYTIC CAPACITOR

(71) Applicant: Murata Manufacturing Co., Ltd., Nagaokakyo (JP)

(72) Inventors: Takeshi Furukawa, Nagaokakyo (JP); Katsutomo Aritomi, Nagaokakyo (JP); Koji Fujimoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 15 days.

(21) Appl. No.: 16/953,546

(22) Filed: Nov. 20, 2020

(65) Prior Publication Data

US 2021/0074484 A1 Mar. 11, 2021

Related U.S. Application Data

(63) Continuation of application No. 16/163,663, filed on Oct. 18, 2018, now Pat. No. 10,879,011.

(30) Foreign Application Priority Data

Oct. 20, 2017 (JP) .............................. JP2017-204019

(51) Int. Cl.
*H01G 9/15* (2006.01)
*H01G 9/012* (2006.01)
(Continued)

(52) U.S. Cl.
CPC ............. *H01G 9/15* (2013.01); *H01G 9/0029* (2013.01); *H01G 9/0036* (2013.01);
(Continued)

(58) Field of Classification Search
CPC ...... H01G 9/15; H01G 9/0029; H01G 9/0036; H01G 9/012; H01G 9/04; H01G 9/08;
(Continued)

(56) References Cited

U.S. PATENT DOCUMENTS

| 5,364,711 | A | * | 11/1994 | Yamada | .................. | H01M 4/86 |
| | | | | | | 429/514 |
| 6,400,554 | B1 | * | 6/2002 | Shiraishi | ................ | H01G 9/042 |
| | | | | | | 29/25.03 |
| 6,563,693 | B2 | | 5/2003 | Nakada et al. | | |
| 6,909,596 | B2 | | 6/2005 | Shimoyama et al. | | |
| 2002/0158307 | A1 | * | 10/2002 | Honda | .................. | H01G 4/232 |
| | | | | | | 257/532 |

(Continued)

FOREIGN PATENT DOCUMENTS

JP 2001297944 A 10/2001
JP 2005026257 A 1/2005

*Primary Examiner* — Michael P McFadden
(74) *Attorney, Agent, or Firm* — ArentFox Schiff LLP

(57) ABSTRACT

A solid electrolytic capacitor that includes a multilayer body element having a number of first layers that are laminated together, the multilayer body element having first and second main surfaces that oppose each other in a lamination direction, first and second side surface that oppose each other in a width direction, and first and second end surfaces that oppose each other in a length direction; a sealing portion covering the first and the second main surfaces and the first and the second side surfaces, wherein in the first layers, a cutting region is formed at an end of the multilayer body element on a side of the second end surface and a sealing portion filled with a sealing material in the cutting region is exposed at the second end surface.

6 Claims, 17 Drawing Sheets

(51) Int. Cl.
*H01G 9/04* (2006.01)
*H01G 9/00* (2006.01)
*H01G 9/08* (2006.01)
*H01G 9/26* (2006.01)
*H01G 9/10* (2006.01)

(52) U.S. Cl.
CPC ............... *H01G 9/012* (2013.01); *H01G 9/04* (2013.01); *H01G 9/08* (2013.01); *H01G 9/10* (2013.01); *H01G 9/26* (2013.01)

(58) Field of Classification Search
CPC ............ H01G 9/10; H01G 9/26; H01G 9/045; H01G 9/048
See application file for complete search history.

(56) References Cited

U.S. PATENT DOCUMENTS

| | | | |
|---|---|---|---|
| 2003/0026064 A1* | 2/2003 | Nakada | H01G 9/15 361/523 |
| 2003/0103320 A1 | 6/2003 | Shimada et al. | |
| 2004/0125543 A1* | 7/2004 | Hirano | H05K 1/186 361/523 |
| 2004/0264111 A1 | 12/2004 | Shimoyama et al. | |
| 2009/0103240 A1 | 4/2009 | Nagamiya et al. | |
| 2010/0330457 A1* | 12/2010 | Ohmori | H01M 8/2432 429/495 |

* cited by examiner

METHOD FOR PRODUCING SOLID ELECTROLYTIC CAPACITOR, AND SOLID ELECTROLYTIC CAPACITOR

CROSS REFERENCE TO RELATED APPLICATIONS

The present application is a continuation of application Ser. No. 16/163,663, filed Oct. 18, 2018, which claims priority to Japanese Patent Application No. 2017-204019, filed Oct. 20, 2017. The entire contents of each of which are incorporated herein by reference.

BACKGROUND OF THE INVENTION

Field of the Invention

The present invention relates to a method for producing a solid electrolytic capacitor, and a solid electrolytic capacitor.

Description of the Related Art

Solid electrolytic capacitors include a valve metal substrate having a porous portion on a surface of a substrate formed of a valve metal such as aluminum; a dielectric layer formed on the surface of the porous portion; a solid electrolytic layer disposed on the dielectric layer; and an electric conductor layer (also referred to as a current collector layer) disposed on the solid electrolytic layer.

For example, Japanese Unexamined Patent Application Publication No. 2005-26257 discloses a solid electrolytic capacitor in which a dielectric film is formed on a surface of a valve metal porous foil; on this dielectric film, a solid electrolytic layer is formed; on this solid electrolytic layer, a current collector layer is formed to provide a capacitor element; such capacitor elements are laminated; subsequently, an outer package is disposed such that such laminated valve metal porous foils are exposed at one end surface of the peripheral portion and, on the other end surface, portions of current collector layers or cathode portions of the capacitor elements are exposed; and, on both end surfaces of the outer package, outer electrodes are disposed, wherein, on the exposed surfaces of the valve metal porous foils, zinc layers are formed, and, on these zinc layers, nickel layers are formed.

SUMMARY OF THE INVENTION

Japanese Unexamined Patent Application Publication No. 2005-26257 states that, on a capacitor element, epoxy resin or the like is used to form an outer package by resin molding; and, subsequently, the outer package is physically or chemically polished and removed so as to expose, at one end of the outer package, an aluminum foil serving as an anode portion, and, at the other end of the outer package, a copper foil serving as a cathode portion.

However, when the method described in Japanese Unexamined Patent Application Publication No. 2005-26257 is used to produce a plurality of solid electrolytic capacitors, capacitor elements need to be sealed with resin one by one, and subsequently the end surfaces of each capacitor element need to be polished. This makes the production steps complicated, and causes an increase in the production costs.

Accordingly, an object of the present invention is to provide a method for producing a solid electrolytic capacitor that enables efficient production of a plurality of solid electrolytic capacitors. In particular, an object of the present invention is to provide a method for producing a solid electrolytic capacitor that enables efficient production of solid electrolytic capacitors in which a valve metal substrate serving as an anode portion is exposed at one end surface, and a metal foil serving as a cathode portion is exposed at the other end surface. Another object of the present invention is to provide a solid electrolytic capacitor produced by such a production method.

A method for producing a solid electrolytic capacitor according to a first embodiment of the present invention includes the steps of:
(A) preparing a first sheet;
(B) preparing a second sheet;
(C) covering the first sheet with an insulating material;
(D) forming an electric conductor layer on the first sheet;
(E) producing a laminated sheet;
(F) producing a multilayer block body;
(G) cutting the multilayer block body to produce a plurality of multilayer body elements; and
(H) forming a first outer electrode and a second outer electrode.

A method for producing a solid electrolytic capacitor according to a second embodiment of the present invention includes the steps of:
(A) preparing a first sheet;
(B) preparing a second sheet;
(E) producing a laminated sheet;
(F) optionally producing a multilayer block body;
(G') cutting the laminated sheet or the multilayer block body to produce a plurality of multilayer body elements; and
(H') forming a first outer electrode and a second outer electrode on each of the multilayer body elements.

In the first embodiment and the second embodiment, the first sheet includes a valve metal substrate including, on a surface, a dielectric layer, and a solid electrolytic layer disposed on the dielectric layer.

The first sheet further includes a plurality of element regions, and the element regions are each defined by a first end and a second end that oppose each other in a length direction, and by a first side and a second side that oppose each other in a width direction.

In the first sheet, a first through-hole is formed so as to extend across the first end of each element region, and have a width equal to or larger than a width of the element region, and at least one second through-hole is formed so as to extend across the second end of each element region, and have a width smaller than the width of the element region.

In the first embodiment and the second embodiment, the second sheet is formed of a metal foil.

The second sheet further includes a plurality of element regions, and the element regions are each defined by a first end and a second end that oppose each other in a length direction, and by a first side and a second side that oppose each other in a width direction.

In the second sheet, at least one third through-hole is formed so as to extend across the first end of each element region, and have a width smaller than a width of the element region, and a fourth through-hole is formed so as to extend across the second end of each element region, and have a width equal to or larger than the width of the element region.

In the first embodiment, in the step (C), the first end and the second end, and the first side and the second side of each element region of the first sheet are covered with the insulating material.

In the first embodiment, in the step (D), the electric conductor layer is formed on the solid electrolytic layer of the first sheet.

In the first embodiment and the second embodiment, in the step (E), the first sheet and the second sheet are laminated such that the first ends of corresponding element regions of the sheets face each other, and the second ends of corresponding element regions of the sheets face each other.

Furthermore, in the laminated sheet, the first through-hole and the at least one third through-hole communicate with each other in a lamination direction, and the at least one second through-hole and the fourth through-hole communicate with each other in the lamination direction.

In the first embodiment and the second embodiment, in the step (F), of a first main surface and a second main surface of the laminated sheet that oppose each other in the lamination direction, from at least one of the main surfaces, a sealing material is filled into the first through-hole, the at least one third through-hole, the at least one second through-hole, and the fourth through-hole.

Note that, in the second embodiment, the multilayer block body is optionally produced.

In the first embodiment, in the step (G), the multilayer block body is cut at positions of the first end and the second end of each element region such that sealing portions formed by filling the sealing material into the through-holes are each divided to both sides, and, after cutting of the multilayer block body along the first side and the second side of each element region, a gap formed by the cutting is filled with a sealing material, and the multilayer block body is cut such that a sealing portion formed by filling the gap with the sealing material is divided to both sides.

In the first embodiment, in the step (H), in each of the multilayer body elements, of a first end surface and a second end surface that oppose each other in the length direction, on the first end surface, the first outer electrode is formed, and, on the second end surface, the second outer electrode is formed.

A method for producing a solid electrolytic capacitor according to a third embodiment of the present invention includes the steps of:

(A') preparing first sheets;
(C) covering the first sheets with an insulating material;
(D) forming an electric conductor layer on each of the first sheets;
(E') producing a laminated sheet;
(F") optionally producing a multilayer block body;
(G') cutting the laminated sheet or the multilayer block body to produce a plurality of multilayer body elements; and
(H') forming a first outer electrode and a second outer electrode on each of the multilayer body elements.

A method for producing a solid electrolytic capacitor according to a fourth embodiment of the present invention includes the steps of:

(A') preparing first sheets;
(E') producing a laminated sheet;
(F") producing a multilayer block body;
(G) cutting the multilayer block body to produce a plurality of multilayer body elements; and
(H') forming a first outer electrode and a second outer electrode on each of the multilayer body elements.

In the third embodiment and the fourth embodiment, each first sheet includes a valve metal substrate including, on a surface, a dielectric layer, and a solid electrolytic layer disposed on the dielectric layer.

The first sheet further includes a plurality of element regions, and the element regions are each defined by a first end and a second end that oppose each other in a length direction, and by a first side and a second side that oppose each other in a width direction.

In the first sheet, a first through-hole is formed so as to extend across the first end of each element region, and have a width equal to or larger than a width of the element region.

In the third embodiment, in the step (C), the first end and the second end, and the first side and the second side of each element region of each of the first sheets are covered with the insulating material.

In the third embodiment, in the step (D), the electric conductor layer is formed on the solid electrolytic layer of each of the first sheets.

In the third embodiment and the fourth embodiment, in the step (E'), the first sheets are laminated such that the first end and another first end of corresponding element regions of the first sheets face each other, and the second end and another second end of corresponding element regions of the first sheets face each other.

In the third embodiment and the fourth embodiment, in the multilayer block body, the first through-hole is filled with a sealing material.

Note that, in the third embodiment, the multilayer block body is optionally produced.

In the fourth embodiment, in the step (G), the multilayer block body is cut at positions of the first end and the second end of each element region such that a sealing portion formed by filling the sealing material into the through-hole is divided to both sides, and, after cutting of the multilayer block body along the first side and the second side of each element region, a gap formed by the cutting is filled with a sealing material, and the multilayer block body is cut such that a sealing portion formed by filling the gap with the sealing material is divided to both sides.

A solid electrolytic capacitor according to preferred embodiments of the present invention includes a multilayer body element, a first outer electrode, and a second outer electrode.

In the multilayer body element, a first layer and a second layer are laminated.

The first layer includes a valve metal substrate including, on a surface, a dielectric layer, and a solid electrolytic layer disposed on the dielectric layer.

The second layer is formed of a metal foil.

In the multilayer body element, of a first end surface and a second end surface that oppose each other in a length direction, at the first end surface, the metal foil and a first sealing portion are exposed, and, at the second end surface, the valve metal substrate and a second sealing portion are exposed.

The first outer electrode is disposed on the first end surface of the multilayer body element, and connected to the metal foil.

The second outer electrode is disposed on the second end surface of the multilayer body element, and connected to the valve metal substrate.

In a width direction, a sum $A1$ of, in a single layer, distances of exposure of the metal foil at the first end surface is smaller than a maximum width $B1$ of the metal foil, and a sum $A2$ of, in a single layer, distances of exposure of the valve metal substrate at the second end surface is smaller than a maximum width $B2$ of the valve metal substrate.

The present invention enables efficient production of a plurality of solid electrolytic capacitors. In particular, the present invention enables efficient production of solid electrolytic capacitors in which a valve metal substrate serving as an anode portion is exposed at one end surface, and a metal foil serving as a cathode portion is exposed at the other end surface.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, methods for producing a solid electrolytic capacitor and solid electrolytic capacitors according to embodiments of the present invention will be described.

However, the present invention is not limited to the following features, and the features may be appropriately changed without departing from the spirit and scope of the present invention. Incidentally, combinations of two or more features appropriately selected from the following features of embodiments according to the present invention also fall within the scope of the present invention.

The following embodiments are mere examples, and it is obvious that features of embodiments may be partially substituted with features of other embodiments, and features of different embodiments may be combined. The second and later embodiments will be described, without repeating the descriptions of features shared with the first embodiment, but substantially with descriptions of differences from the first embodiment. In particular, the same advantages provided by the same features as in the first embodiment will not be repeatedly mentioned in the other embodiments.

First Embodiment

Method for Producing Solid Electrolytic Capacitor

Hereinafter, an example of a method for producing a solid electrolytic capacitor according to a first embodiment of the present invention will be described for each of the steps.

(A) Step of Preparing First Sheet

A first sheet is prepared. The first sheet includes a valve metal substrate including, on a surface, a dielectric layer, and a solid electrolytic layer disposed on the dielectric layer. The first sheet further includes a plurality of element regions. In the first sheet, each element region is defined by a first end and a second end that oppose each other in a length direction, and by a first side and a second side that oppose each other in a width direction orthogonal to the length direction. In addition, in the first sheet, a first through-hole is formed so as to extend across the first end of each element region, and have a width equal to or larger than the width of the element region; and at least one second through-hole is formed so as to extend across the second end of each element region, and have a width smaller than the width of the element region.

Figure 1A:
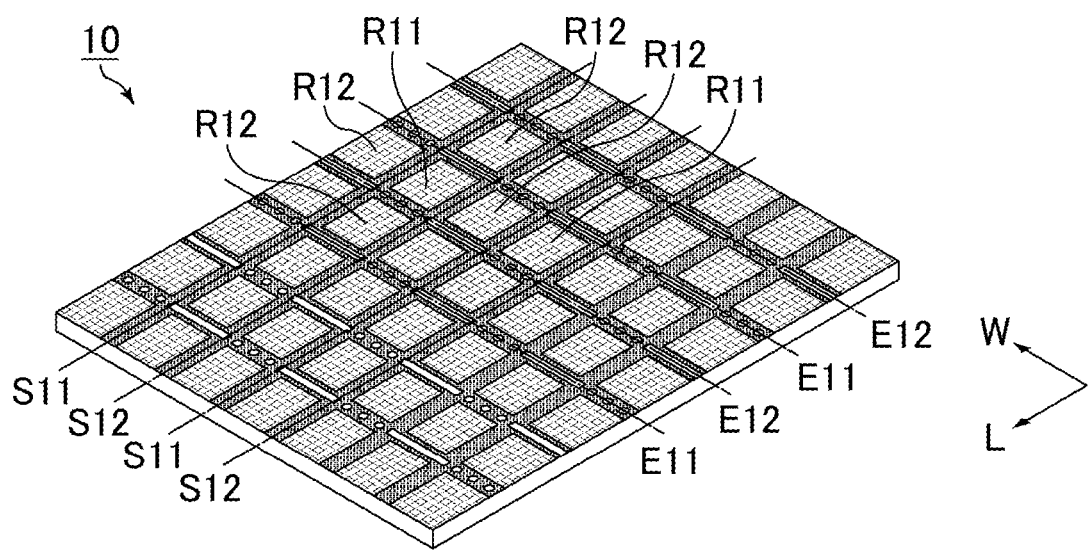
FIG. 1A is a perspective view schematically illustrating an example of a first sheet.
Figure 1B:
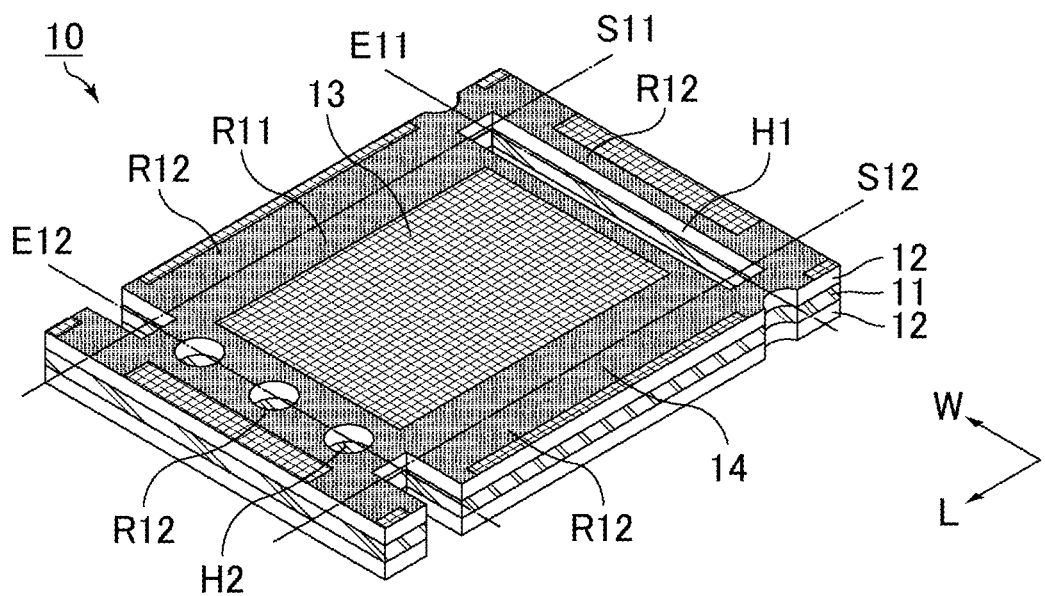
FIG. 1B is an enlarged perspective view of a portion in FIG. 1A.

FIG. 1A is a perspective view schematically illustrating an example of the first sheet, and FIG. 1B is an enlarged perspective view of a portion in FIG. 1A.

A first sheet 10 in FIG. 1A and FIG. 1B includes a plurality of element regions R11 (hereafter, referred to as first element regions), and a plurality of element regions R12 (hereafter, referred to as second element regions).

Referring to FIG. 1B, each first element region R11 is defined by a first end E11 and a second end E12, which oppose each other in a length direction (L direction), and a first side S11 and a second side S12, which oppose each other in a width direction (W direction) orthogonal to the length direction. In the first element region R11, the size in the length direction (L direction) is larger than the size in the width direction (W direction). A single first through-hole H1 is formed so as to extend across the first end E11 (in its length direction) of the first element region R11. In addition, a plurality of (in FIG. 1B, three) second through-holes H2 are formed so as to extend across the second end E12 (in its length direction) of the first element region R11. The first through-hole H1 is constituted by a single long hole having a width equal to or larger than the width of the first element region R11. The second through-holes H2 are constituted by a plurality of substantially round holes having a width smaller than the width of the first element region R11.

On the other hand, each second element region R12 has the same shape as the first element region R11, but is oriented opposed to the first element region R11 in terms of the first end E11 and the second end E12.

Referring to FIG. 1A, in the first sheet 10, the first element regions R11 and the second element regions R12 are alternately arranged in the length direction. Referring to FIG. 1B, the first element region R11 and an adjacent second element region R12 share the first end E11 and the first through-hole H1; and the first element region R11 and another adjacent second element region R12 share the second end E12 and the second through-holes H2.

Referring to FIG. 1A, in the first sheet 10, the first element regions R11 and the second element regions R12 are alternately arranged in the width direction. Referring to FIG. 1B, the first element region R11 and an adjacent second element region R12 share the first side S11; and the first element region R11 and another adjacent second element region R12 share the second side S12.

Referring to FIG. 1B, the first sheet 10 includes a valve metal substrate 11 including, on its surfaces, porous portions (not shown), dielectric layers 12 formed on the surfaces of the porous portions, and solid electrolytic layers 13 disposed within the element regions on the dielectric layers 12. In the first sheet 10, the ends and sides of each element region are covered with a mask layer 14 formed of an insulating material; and, within the region surrounded by the mask layer 14, the solid electrolytic layer 13 is disposed.

Referring to FIG. 1B, in the first sheet 10, the valve metal substrate 11 includes, on both surfaces, porous portions; on the surface of each porous portion, the dielectric layer 12 is formed; and, on the dielectric layer 12, the solid electrolytic layer 13 is disposed. However, when the second sheet is not laminated to one of the surfaces of the first sheet, the solid electrolytic layer needs not to be disposed on a surface (of the valve metal substrate) to which the second sheet (metal foil) is not laminated. In this case, on the surface (of the valve metal substrate) to which the second sheet (metal foil) is not laminated, no dielectric layer may be formed, and no porous portion may be formed. The first sheet 10 may have a structure in which the valve metal substrate 11 includes, only on one of its surfaces, a porous portion, and the dielectric layer 12 is formed on the surface of the porous portion.

The first sheet is preferably produced in the following manner.

The valve metal substrate 11 including, on a surface, a porous portion is first prepared. On the surface of the porous portion, the dielectric layer 12 is formed. For example, when an aluminum foil is used as the valve metal substrate, anodic oxidation treatment (also referred to as chemical conversion treatment) may be performed, in an aqueous solution containing, for example, ammonium adipate, on the surface of the aluminum foil, to thereby form a dielectric layer constituted by an oxide film.

The valve metal substrate is formed of valve metal, which provides, what is called, a valve effect. Examples of the valve metal include elemental metals such as aluminum, tantalum, niobium, titanium, and zirconium, and alloys containing such metals. Of these, preferred are aluminum and aluminum alloys.

The valve metal substrate preferably has the shape of a flat plate, more preferably the shape of a foil. Examples of the porous portion include an etched layer formed on the surface of the valve metal substrate, and a porous layer formed on the surface of the valve metal substrate by printing and sintering. When the valve metal is aluminum or aluminum alloy, the etched layer is preferably employed; when the valve metal is titanium or titanium alloy, the porous layer is preferably employed.

The thickness of the valve metal substrate is not particularly limited, and the thickness of the portion except for the porous portion is preferably 5 µm or more and 100 µm or less. The thickness of the porous portion (thickness on one of the surfaces) is preferably 5 µm or more and 200 µm or less.

The dielectric layer formed on the surface of the porous portion is porous due to the surface state of the porous portion, and has a fine irregular surface profile. The dielectric layer is preferably constituted by an oxide film of the valve metal.

Alternatively, in order to improve the production efficiency, as the valve metal substrate including, on a surface, the dielectric layer, a converted foil having been subjected to chemical conversion treatment may be employed.

Subsequently, the mask layer 14 is preferably formed, which covers the ends and sides of each element region.

The mask layer is formed by, for example, applying a mask material composed of an insulating material such as an insulating resin to the surface of the valve metal substrate, and performing, for example, heating to solidify or cure the mask material. The mask material is preferably applied by, for example, screen printing, using a dispenser, or ink jet printing.

Examples of the insulating material of the mask material include insulating resins such as a polyphenylsulfone resin, a polyethersulfone resin, a cyanate resin, fluororesins (for example, tetrafluoroethylene, and a tetrafluoroethylene-perfluoroalkylvinyl ether copolymer), a composition composed of soluble polyimidesiloxane and an epoxy resin, a polyimide resin, a polyamide-imide resin, and derivatives or precursors of the foregoing.

Subsequently, the first through-hole H1 is formed so as to extend across the first end E11 of each element region; and the second through-holes H2 are formed so as to extend across the second end E12 of each element region.

The first through-hole and the second through-holes are formed by, for example, laser processing, etching, or punching.

Subsequently, within each element region on the dielectric layer 12, the solid electrolytic layer 13 is formed. At this time, in a region surrounded by the mask layer 14, the solid electrolytic layer 13 is preferably formed. For example, a treatment liquid or a dispersion liquid described below may be applied by, for example, sponge transfer, screen printing, using a dispenser, or ink jet printing, onto the dielectric layer, to thereby form the solid electrolytic layer in the predetermined region.

The solid electrolytic layer is formed by, for example, a method of using a treatment liquid containing a monomer such as 3,4-ethylenedioxythiophene to form a polymer film such as a poly(3,4-ethylenedioxythiophene) film on the surface of the dielectric layer, and a method of applying a dispersion liquid of a polymer such as poly(3,4-ethylenedioxythiophene) onto the surface of the dielectric layer, and drying the dispersion liquid. Incidentally, preferably, an inner layer filling the pores (recesses) of the dielectric layer is formed, and then an outer layer covering the dielectric layer is formed, to thereby form the solid electrolytic layer.

Examples of the material constituting the solid electrolytic layer include conductive polymers such as polypyrroles, polythiophenes, and polyanilines. Of these, polythiophenes are preferred, particularly preferred is poly(3,4-ethylenedioxythiophene), which is referred to as PEDOT. The conductive polymers may contain a dopant such as polystyrenesulfonic acid (PSS).

Incidentally, the first through-hole H1 and the second through-holes H2 may be formed before formation of the mask layer 14, or after formation of the solid electrolytic layer 13.

The whole size of the first sheet is determined in accordance with, for example, the size, shape, number, or arrangement of element regions, and production capacity, and is not particularly limited. The shape of each element region of the first sheet is not particularly limited, but is preferably rectangular. In this case, the first end and the second end may be shorter or longer than the first side and the second side.

The first sheet includes a plurality of element regions from the viewpoint of production efficiency. In particular, preferably, the first sheet includes the first element regions and the second element regions in which the first element regions and the second element regions are alternately arranged in the length direction, more preferably, the first element regions and the second element regions are also alternately arranged in the width direction. When the first element regions and the second element regions are alternately arranged, the first through-holes are not localized in the width direction of the first sheet, which tends not to cause a decrease in the strength of the sheet.

In the first sheet, when the first element regions and the second element regions are alternately arranged in the length direction, preferably, each first element region and an adjacent second element region share the first end and the first through-hole, and the first element region and another adjacent second element region share the second end and the second through-holes. This enables a reduction in the number of cutting for dividing the element regions, and a reduction in the amount of portions to be discarded.

However, when the first sheet includes the first element regions and the second element regions, the first element regions and the second element regions may not be alternately arranged in the length direction, or may not be alternately arranged in the width direction. When the first element regions and the second element regions are alternately arranged in the length direction, each first element region and an adjacent second element region may not share the first end or the first through-hole, and the first element region and another adjacent second element region may not share the second end or the second through-holes. Furthermore, when the first element regions and the second element regions are alternately arranged in the width direction, each first element region and an adjacent second element region may not share the first side, and the first element region and another adjacent second element region may not share the second side.

As long as the first through-hole has a width equal to or larger than the width of the element region, the shape of the first through-hole is not particularly limited.

As long as the second through-hole has a width smaller than the width of the element region, the second through-hole is not particularly limited in terms of, for example, shape, number, or arrangement. However, in each element region, two or more second through-holes are preferably formed in the width direction. When two or more second through-holes are formed, these through-holes are preferably formed at equal intervals.

Incidentally, when each second through-hole has an excessively small width, filling with a sealing material becomes difficult in a step described later. On the other hand, when the ratio of the total width of the second through-holes to the width of the element region is excessively high, the ratio of the valve metal substrate exposed at the end surface of the solid electrolytic capacitor decreases, which tends to cause an increase in ESR.

(B) Step of Preparing Second Sheet

A second sheet is separately prepared. The second sheet is formed of a metal foil. Furthermore, the second sheet includes a plurality of element regions. In the second sheet, each element region is defined by a first end and a second end that oppose each other in a length direction, and by a first side and a second side that oppose each other in a width direction orthogonal to the length direction. Furthermore, in the second sheet, at least one third through-hole is formed so as to extend across the first end of each element region, and have a width smaller than the width of the element region; and a fourth through-hole is formed so as to extend across the second end of each element region, and have a width equal to or larger than the width of the element region.

Figure 2A:
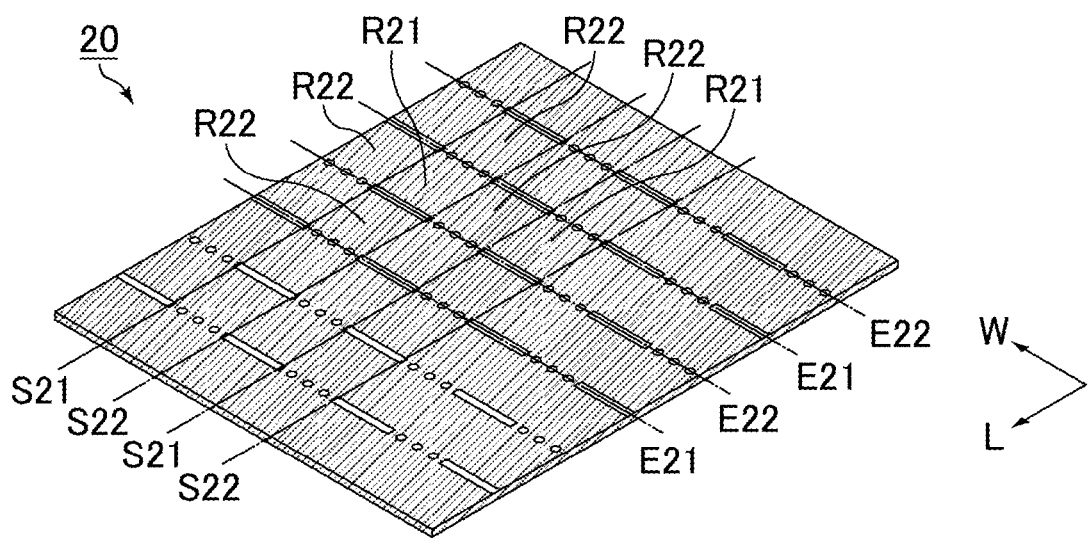
FIG. 2A is a perspective view schematically illustrating an example of a second sheet.
Figure 2B:
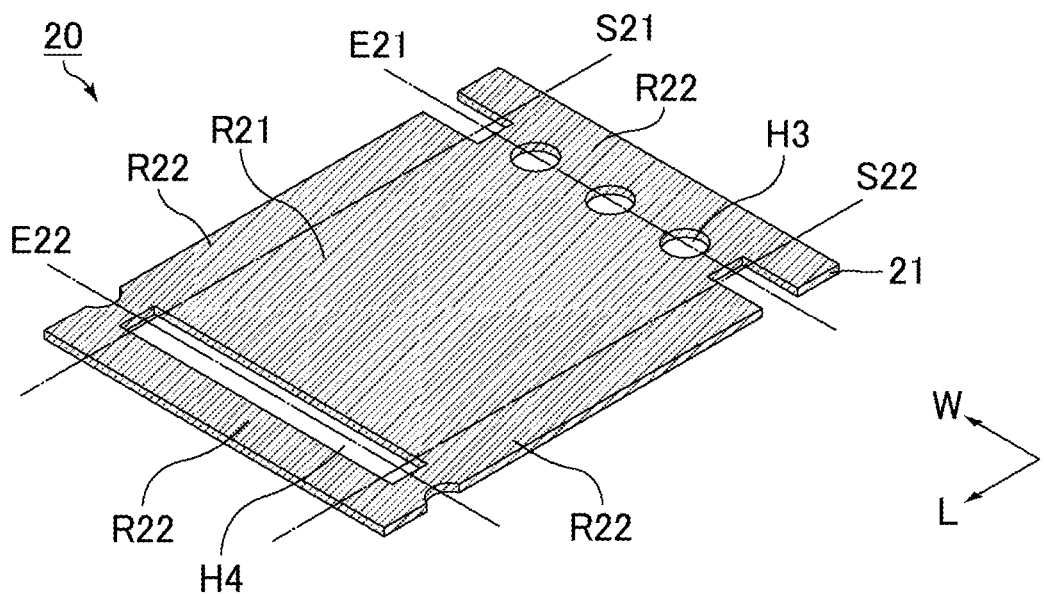
FIG. 2B is an enlarged perspective view of a portion in FIG. 2A.

FIG. 2A is a perspective view schematically illustrating an example of the second sheet. FIG. 2B is an enlarged perspective view of a portion in FIG. 2A.

A second sheet 20 in FIG. 2A and FIG. 2B includes a plurality of element regions R21 (hereafter, referred to as first element regions), and a plurality of element regions R22 (hereafter, referred to as second element regions).

Referring to FIG. 2B, each first element region R21 is defined by a first end E21 and a second end E22, which oppose each other in a length direction (L direction), and by a first side S21 and a second side S22, which oppose each other in a width direction (W direction) orthogonal to the length direction. A plurality of (in FIG. 2B, three) third through-holes H3 are formed so as to extend across the first end E21 (in its length direction) of the first element region R21; and a single fourth through-hole H4 is formed so as to extend across the second end E22 (in its length direction) of the first element region R21. The third through-holes H3 are constituted by a plurality of substantially round holes having a width smaller than the width of the first element region R21. The fourth through-hole H4 is constituted by a single long hole having a width equal to or larger than the width of the first element region R21.

On the other hand, the second element region R22 has the same shape as the first element region R21, but is oriented opposed to the first element region R21 in terms of the first end E21 and the second end E22.

Referring to FIG. 2A, in the second sheet 20, the first element regions R21 and the second element regions R22 are alternately arranged in the length direction. Referring to FIG. 2B, each first element region R21 and an adjacent second element region R22 share the first end E21 and the third through-holes H3, and the first element region R21 and another adjacent second element region R22 share the second end E22 and the fourth through-hole H4.

Referring to FIG. 2A, in the second sheet 20, the first element regions R21 and the second element regions R22 are alternately arranged in the width direction. Referring to FIG. 2B, each first element region R21 and an adjacent second element region R22 share the first side S21, and the first element region R21 and another adjacent second element region R22 share the second side S22.

Referring to FIG. 2B, the second sheet 20 is formed of a metal foil 21.

The second sheet is preferably produced in the following manner.

The metal foil 21 is first prepared.

The metal foil is preferably formed of at least one metal selected from the group consisting of aluminum, copper, silver, and alloys containing the foregoing metals as the main components.

The metal foil formed of such a metal enables a reduction in the resistance of the metal foil, which enables a reduction in ESR.

As the metal foil, a metal foil may be used that is provided with, on the surface, carbon coating or titanium coating by a film formation method such as sputtering or vapor deposition.

The thickness of the metal foil is not particularly limited; however, from the viewpoint of achieving a reduction in ESR, the thickness is preferably 5 µm or more and 100 µm or less.

The metal foil preferably has, in the surface, a roughened surface.

Such a metal foil provided with, in its surface, a roughened surface enables an improvement in the adhesion between the metal foil and the solid electrolytic layer, or the adhesion between the metal foil and another electric conductor layer, which enables a reduction in ESR.

The method of forming the roughened surface is not particularly limited. For example, etching may be performed to form the roughened surface. In particular, when the metal foil is formed of aluminum, the foil having been subjected to roughening treatment (etching treatment) is preferably coated with carbon or titanium in order to achieve a reduction in resistance.

The metal foil may be provided with, on the surface, a coating layer composed of an anchor coating agent. Such a metal foil provided with, on the surface, a coating layer composed of an anchor coating agent, enables an improvement in the adhesion between the metal foil and the solid electrolytic layer, or the adhesion between the metal foil and another electric conductor layer, which enables a reduction in ESR.

Subsequently, the third through-holes H3 are formed so as to extend across the first end E21 of each element region, and the fourth through-hole H4 is formed so as to extend across the second end E22 of each element region.

The third through-holes and the fourth through-hole are formed by, for example, laser processing, etching, or punching.

The whole size of the second sheet is not particularly limited, but is preferably the same as the whole size of the first sheet. The shape, number, and arrangement of element regions of the second sheet are preferably the same as the shape, number, and arrangement of element regions of the first sheet, which the second sheet faces.

The second sheet includes a plurality of element regions from the viewpoint of production efficiency. In particular, preferably, the second sheet includes the first element regions and the second element regions, and the first element regions and the second element regions are alternately arranged in the length direction, more preferably the first element regions and the second element regions are also alternately arranged in the width direction. When the first element regions and the second element regions are alternately arranged, the fourth through-holes are not localized in the width direction of the second sheet, which tends not to cause a decrease in the strength of the sheet.

In the second sheet, when the first element regions and the second element regions are alternately arranged in the length direction, preferably, each first element region and an adjacent second element region share the first end and the third through-holes, and the first element region and another adjacent second element region share the second end and the fourth through-hole. This enables a reduction in the number of cutting for dividing the element regions, and a reduction in the amount of portions to be discarded.

However, when the second sheet includes the first element regions and the second element regions, the first element regions and the second element regions may not be alternately arranged in the length direction, and may not be alternately arranged in the width direction. When the first element regions and the second element regions are alternately arranged in the length direction, each first element region and an adjacent second element region may not share the first end or the third through-holes, and the first element region and another adjacent second element region may not share the second end or the fourth through-hole. When the first element regions and the second element regions are alternately arranged in the width direction, each first element region and an adjacent second element region may not share the first side, and the first element region and another adjacent second element region may not share the second side.

As long as the third through-hole has a width smaller than the width of the element region, the third through-hole is not particularly limited in terms of, for example, shape, number, or arrangement. However, in each element region, two or more third through-holes are preferably formed in the width direction. When two or more third through-holes are formed, these through-holes are preferably formed at equal intervals.

Incidentally, when each third through-hole has an excessively small width, filling with a sealing material becomes difficult in a step described later. On the other hand, when the ratio of the total widths of the third through-holes to the width of the element region is excessively high, the ratio of the metal foil exposed at the end surface of the solid electrolytic capacitor decreases, which tends to cause an increase in ESR.

As long as the fourth through-hole has a width equal to or larger than the width of the element region, the shape of the fourth through-hole is not particularly limited.

(E) Step of Producing Laminated Sheet

The first sheet and the second sheet are laminated such that the first ends of corresponding element regions of the sheets face each other and the second ends of corresponding element regions of the sheets face each other, to thereby produce a laminated sheet. In the resultant laminated sheet, the first through-hole communicates with the third through-holes in the lamination direction, and the second through-holes communicate with the fourth through-hole in the lamination direction.

The second through-holes and the third through-holes each preferably linearly communicate from the first main surface to the second main surface of the laminated sheet.

When the first sheet and the second sheet are laminated, the valve metal substrate and the metal foil are connected to each other with another electric conductor layer (disposed on the solid electrolytic layer) therebetween. In this case, the valve metal substrate and the metal foil may be connected to each other with an electroconductive adhesive layer (disposed on the electric conductor layer) therebetween.

For portions not provided with the solid electrolytic layer, the electric conductor layer, or the electroconductive adhesive layer, the valve metal substrate and the metal foil are preferably connected to each other with an insulating adhesive layer therebetween.

Figure 3A:
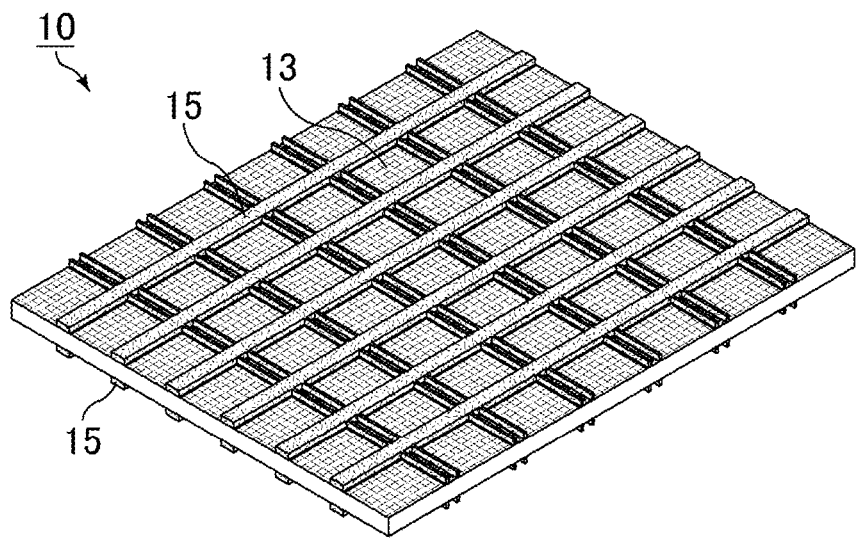
FIG. 3A is a perspective view schematically illustrating an example of a first sheet provided with an insulating adhesive layer.
Figure 3B:
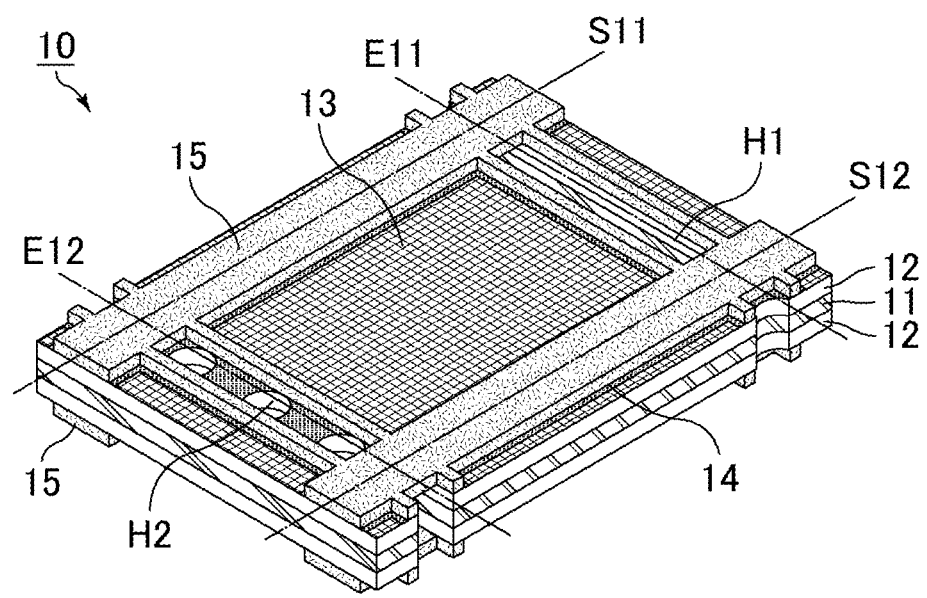
FIG. 3B is an enlarged perspective view of a portion in FIG. 3A.

FIG. 3A is a perspective view schematically illustrating an example of a first sheet provided with an insulating adhesive layer. FIG. 3B is an enlarged perspective view of a portion in FIG. 3A.

In FIG. 3A and FIG. 3B, on the mask layer 14 of the first sheet 10 in FIG. 1A and FIG. 1B, an insulating adhesive layer 15 is disposed.

The insulating adhesive layer is formed by, for example, applying an insulating material such as an insulating resin onto the mask layer, and performing, for example, heating to achieve solidification or curing. The insulating material is preferably applied by, for example, screen printing, using a dispenser, or ink jet printing.

Thus, the method for producing a solid electrolytic capacitor according to the first embodiment of the present invention includes a step (C) of covering the first sheet with an insulating material. In the step (C), in each element region of the first sheet, the first end and the second end, and the first side and the second side are covered with an insulating material.

The step (C) of covering with an insulating material preferably includes a step of forming a mask layer, and a step of forming an insulating adhesive layer on the mask layer.

The insulating adhesive layer and the mask layer may have the same components and viscosity; however, the insulating adhesive layer preferably has components and a viscosity different from those of the mask layer.

The thickness-direction total height of the mask layer and the insulating adhesive layer may be the same as the thickness-direction height of the solid electrolytic layer, but is preferably larger than the thickness-direction height of the solid electrolytic layer.

Figure 4A:
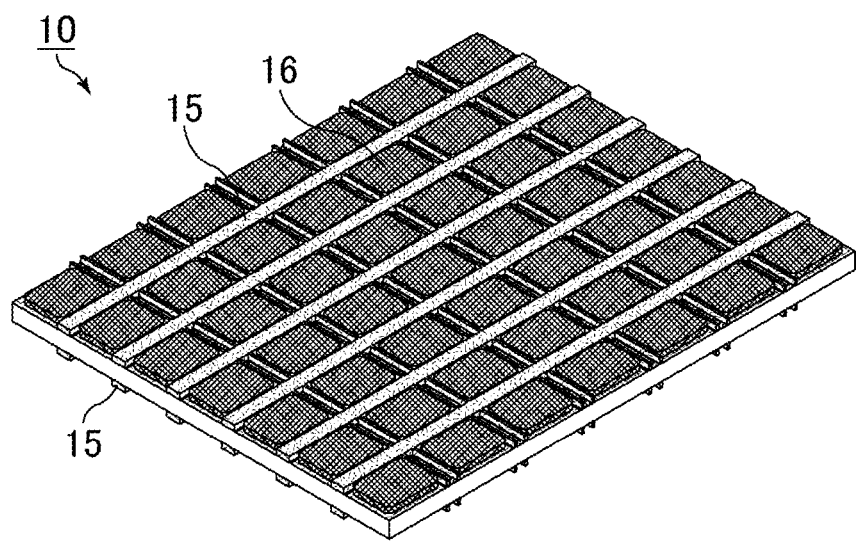
FIG. 4A is a perspective view schematically illustrating an example of a first sheet provided with an insulating adhesive layer and an electric conductor layer.
Figure 4B:
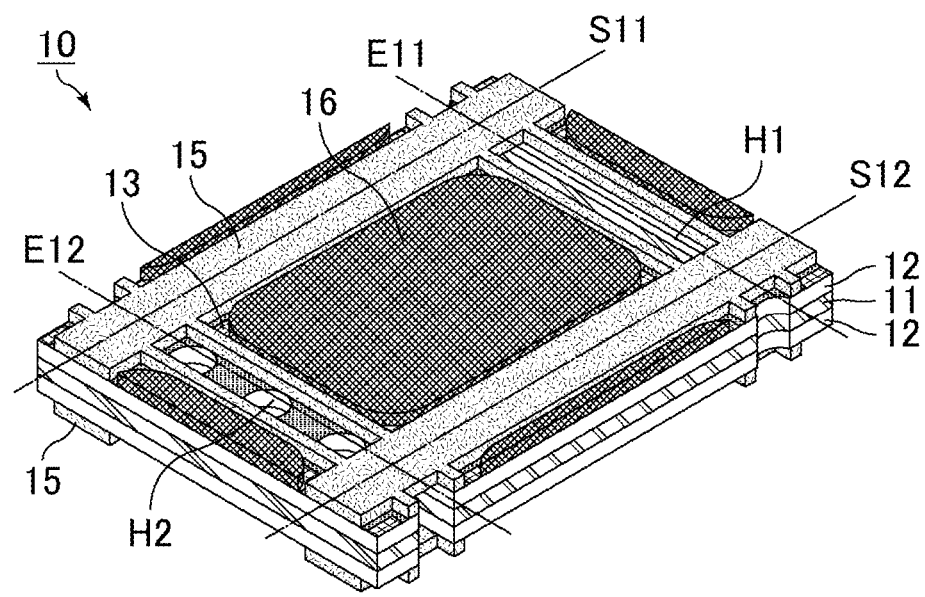
FIG. 4B is an enlarged perspective view of a portion in FIG. 4A.

FIG. 4A is a perspective view schematically illustrating an example of the first sheet provided with an insulating adhesive layer and an electric conductor layer. FIG. 4B is an enlarged perspective view of a portion in FIG. 4A.

In FIG. 4A and FIG. 4B, on the mask layer 14 of the first sheet 10 in FIG. 1A and FIG. 1B, the insulating adhesive layer 15 is disposed; and, on the solid electrolytic layer 13, an electric conductor layer 16 is disposed.

Thus, the method for producing a solid electrolytic capacitor according to the first embodiment of the present invention includes a step (D) of forming an electric conductor layer on the first sheet. In the step (D), on the solid electrolytic layer of the first sheet, an electric conductor layer is formed.

The electric conductor layer is preferably constituted by a carbon layer alone; alternatively, the electric conductor layer may be constituted by a silver layer alone, or two layers that are a carbon layer serving as an underlying layer, and a silver layer serving as an overlying layer. The carbon layer and the silver layer may be respectively formed by, for example, applying carbon paste and silver paste.

During lamination of the first sheet and the second sheet, the metal foil is preferably placed on an underlying layer while this layer is viscous. Carbon paste, silver paste, or a solid electrolytic layer before having been dried are viscous, and hence are suitable for directly placing the metal foil thereon. On the other hand, when a carbon layer, a silver layer, or a solid electrolytic layer having been dried is used as the underlying layer of the metal foil, such layers have less adhesion to the metal foil; thus, preferably, an electroconductive adhesive layer is formed and the metal foil is placed thereon.

Figure 5A:
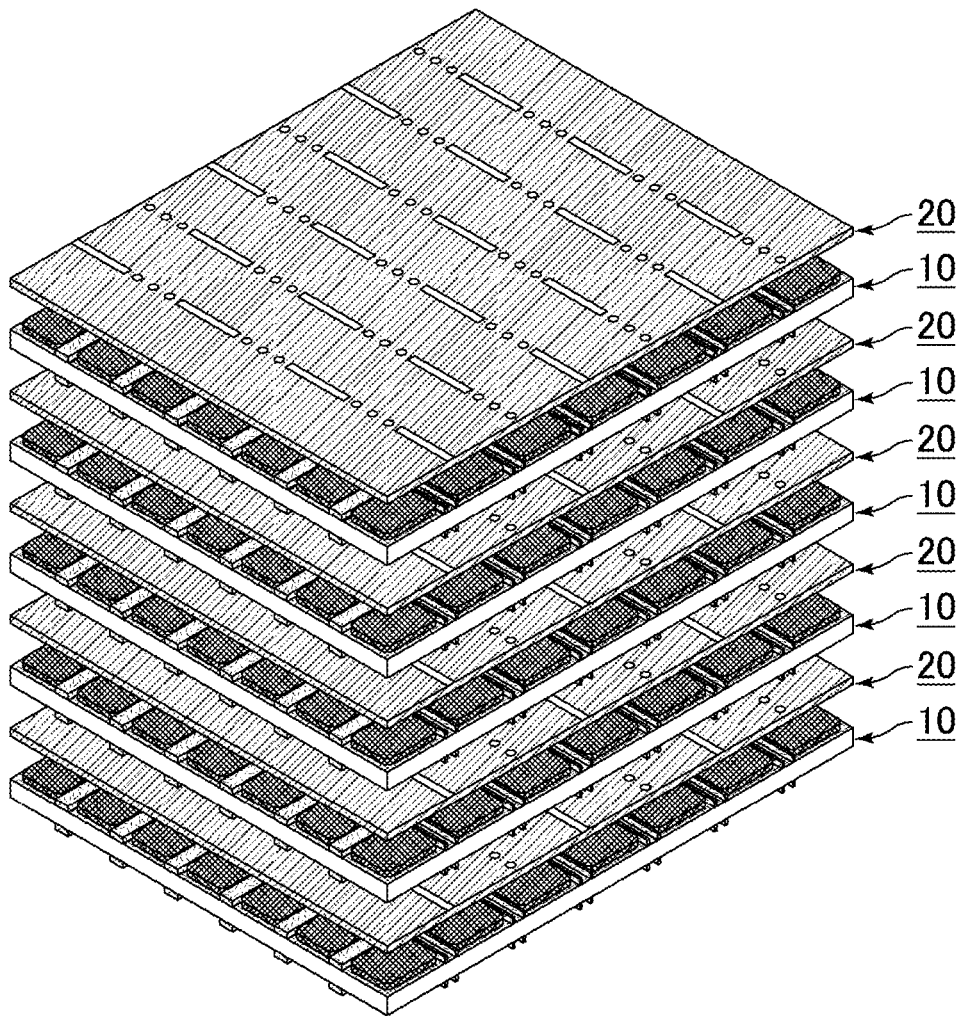
FIG. 5A is a perspective view schematically illustrating an example of first sheets and second sheets to be laminated.
Figure 5B:
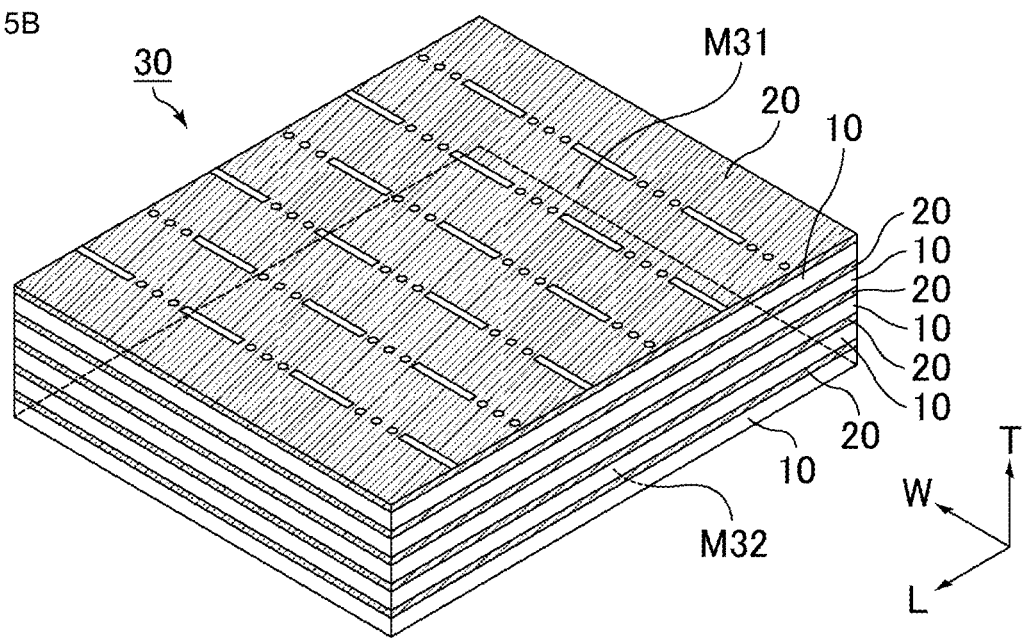
FIG. 5B is a perspective view schematically illustrating an example of the laminated sheet.

FIG. 5A is a perspective view schematically illustrating an example of first sheets and second sheets to be laminated. FIG. 5B is a perspective view schematically illustrating an example of the laminated sheet.

Referring to FIG. 5A, first sheets 10 and second sheets 20 are alternately laminated, to thereby provide a laminated sheet 30 in FIG. 5B. The laminated sheet 30 has a first main surface M31 and a second main surface M32, which oppose each other in the lamination direction (T direction). Incidentally, FIG. 5B does not illustrate some elements including the insulating adhesive layers 15 (this applies to other drawings described below).

FIG. 5A and FIG. 5B illustrate an example in which five first sheets 10 and five second sheets 20 are laminated; a second sheet 20 is disposed so as to provide the first main surface M31 of the laminated sheet 30; and a first sheet 10 is disposed so as to provide the second main surface M32. However, the number of the first sheets and the second sheets laminated is not particularly limited. The number of the first sheets and the number of the second sheets may be the same or different. Thus, for the main surfaces of the laminated sheet, any of a first sheet and a second sheet may be disposed. During production of the laminated sheet, on a substrate formed of, for example, glass epoxy resin, the first sheets and the second sheets may be laminated.

(F) Step of Producing Multilayer Block Body

From at least one of the main surfaces of the resultant laminated sheet, a sealing material is filled into the first through-hole and the third through-holes, and the second through-holes and the fourth through-hole, to thereby produce a multilayer block body.

As described above, in the laminated sheet, the first through-hole communicates with the third through-holes in the lamination direction, and the second through-holes communicate with the fourth through-hole in the lamination direction. This enables, from a main surface of the laminated sheet, filling of a sealing material into the through-holes. This results in, in the resultant multilayer block body, formation of a first sealing portion filling the first through-hole and the third through-holes, and a second sealing portion filling the second through-holes and the fourth through-hole.

The filling with a sealing material may be performed by, a method, for example, resin molding. In this case, in addition to the first sealing portion and the second sealing portion, a third sealing portion may be simultaneously formed that covers at least one of the main surfaces of the laminated sheet. Thus, in the Step (F) of producing a multilayer block body, a step of using a sealing material to cover at least one of the main surfaces of the laminated sheet is preferably simultaneously performed.

Figure 6A:
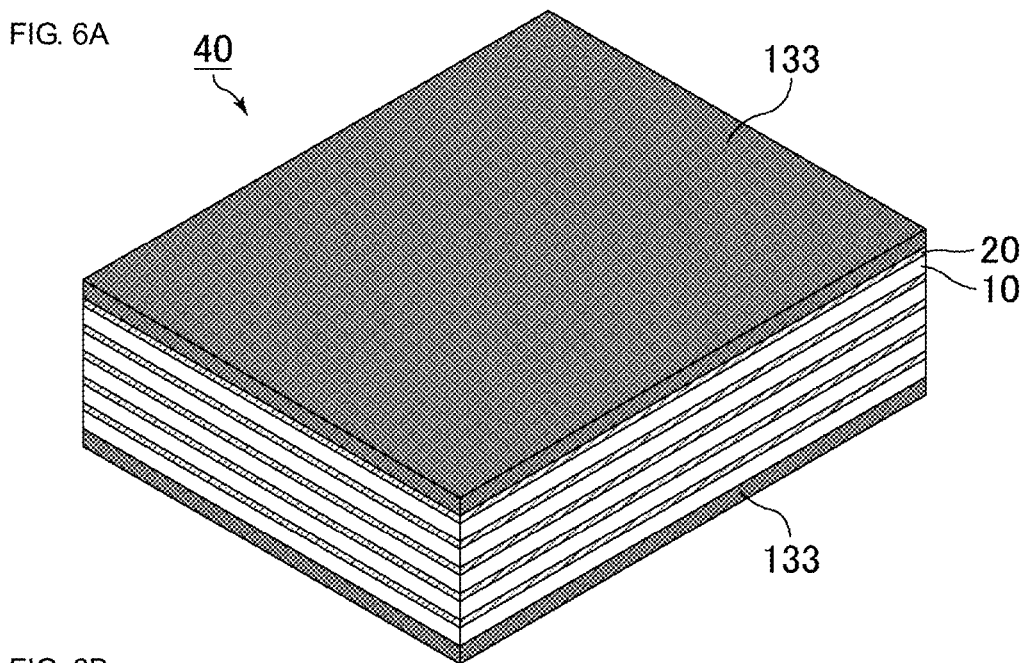
FIG. 6A is a perspective view schematically illustrating an example of a multilayer block body.
Figure 6B:
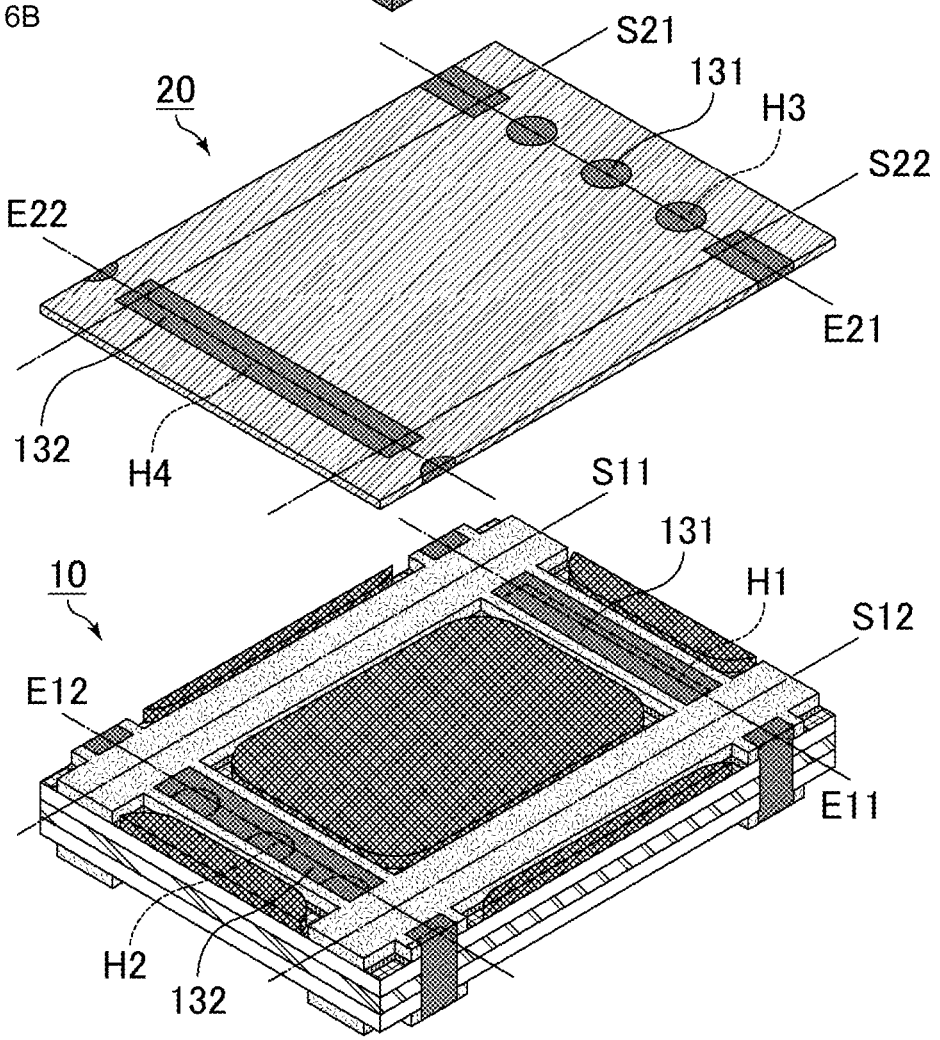
FIG. 6B is an enlarged exploded perspective view of a portion in FIG. 6A.

FIG. 6A is a perspective view schematically illustrating an example of the multilayer block body. FIG. 6B is an enlarged exploded perspective view of a portion in FIG. 6A.

In the multilayer block body 40 in FIG. 6A, the first through-hole and the third through-holes, and the second through-holes and the fourth through-hole are each filled with a sealing material, to thereby form, referring to FIG. 6B, a first sealing portion 131 filling the first through-hole H1 and the third through-holes H3, and a second sealing portion 132 filling the second through-holes H2 and the fourth through-hole H4. Referring to FIG. 6A, the multilayer block body 40 further includes third sealing portions 133, which cover the main surfaces.

The sealing material at least contains resin, preferably contains resin and filler.

Examples of the resin contained in the sealing material include epoxy resin and phenol resin. Examples of the filler contained in the sealing material include silica particles, alumina particles, and metal particles.

When the sealing material contains resin and filler, from the viewpoint of ensuring the filling capability of the sealing material, the filler preferably has a maximum size smaller than the minimum sizes of the second through-holes and the third through-holes.

Incidentally, the size of such a through-hole is, when its cross sectional shape is circular, the diameter; when the cross sectional shape is not circular, the size of the through-hole is the maximum length among lengths of line segments passing through the center of the cross section.

When the sealing material contains resin and filler, from the viewpoint of ensuring the filling capability of the sealing material, the filler preferably has a maximum size smaller than the minimum thickness of the metal foil.

The filler contained in the sealing material preferably has a maximum size of, for example, 30 µm or more and 40 µm or less.

(G) Step of Cutting Multilayer Block Body to Produce Plurality of Multilayer Body Elements The multilayer block body is cut at the positions of the first end and the second end of each element region, and cut at the positions of the first side and the second side of each element region, to thereby produce a plurality of multilayer body elements.

Figure 7A:
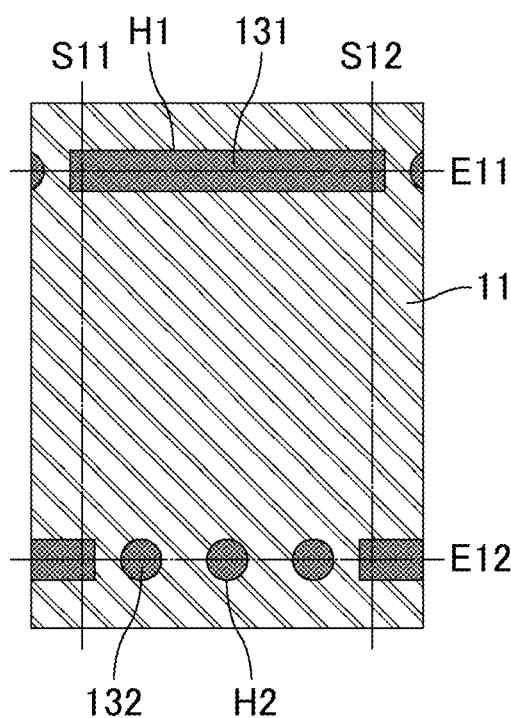
FIG. 7A is a plan view schematically illustrating a valve metal substrate to be cut.
Figure 7B:
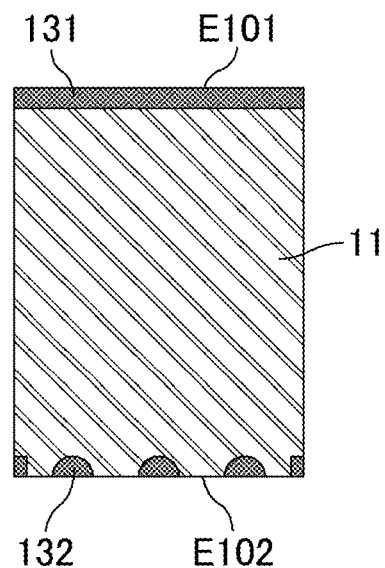
FIG. 7B is a plan view schematically illustrating a valve metal substrate having been cut.

FIG. 7A is a plan view schematically illustrating a valve metal substrate to be cut. FIG. 7B is a plan view schematically illustrating a valve metal substrate having been cut.

Referring to FIG. 7A, in the valve metal substrate 11 constituting the first sheet included in the multilayer block body, the first sealing portion 131 is formed so as to fill the first through-hole H1, which extends across the first end E11 of each element region, and the second sealing portion 132 is formed so as to fill the second through-holes H2, which extend across the second end E12 of each element region.

Thus, when the valve metal substrate 11 is cut with, for example, a dicing machine and at the positions of the first end E11 and the second end E12 of each element region such that the first sealing portion 131 and the second sealing portion 132 are each divided to both sides, referring to FIG. 7B, at a first end surface E101, which is the cut surface at the first end E11, the first sealing portion 131 is exposed, but the valve metal substrate 11 is not exposed. On the other hand, at a second end surface E102, which is the cut surface at the second end E12, the valve metal substrate 11 and the second sealing portion 132 are exposed.

When the valve metal substrate 11 is cut at the positions of the first side S11 and the second side S12 of each element region and with, for example, a dicing machine, referring to FIG. 7B, the valve metal substrate 11 is exposed at both of the resultant cut surfaces.

Figure 8A:
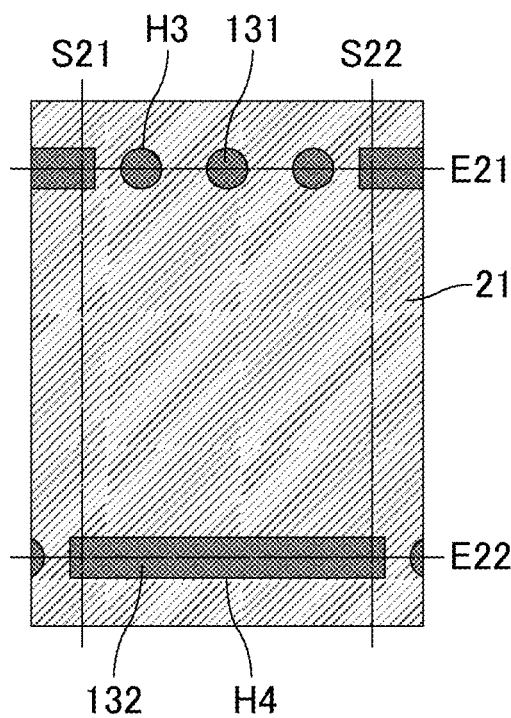
FIG. 8A is a plan view schematically illustrating a metal foil to be cut.
Figure 8B:
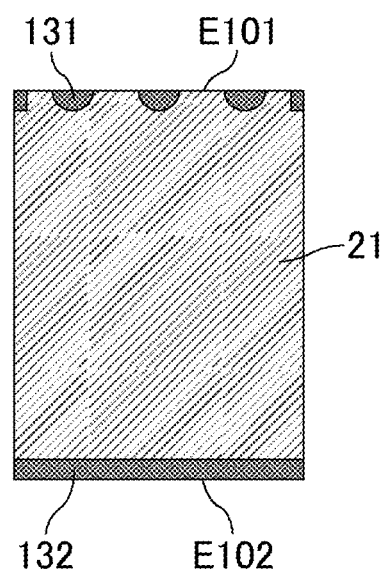
FIG. 8B is a plan view schematically illustrating a metal foil having been cut.

FIG. 8A is a plan view schematically illustrating a metal foil to be cut. FIG. 8B is a plan view schematically illustrating a metal foil having been cut.

Referring to FIG. 8A, in the metal foil 21 constituting the second sheet included in the multilayer block body, the first sealing portion 131 is formed so as to fill the third through-holes H3, which extend across the first end E21 of each element region, and the second sealing portion 132 is formed so as to fill the fourth through-hole H4, which extends across the second end E22 of each element region.

Thus, when the metal foil 21 is cut with, for example, a dicing machine and at the positions of the first end E21 and the second end E22 of each element region such that the first sealing portion 131 and the second sealing portion 132 are each divided to both sides, referring to FIG. 8B, at a first end surface E101, which is the cut surface at the first end E21, the metal foil 21 and the first sealing portion 131 are exposed. On the other hand, at a second end surface E102, which is the cut surface at the second end E22, the second sealing portion 132 is exposed, but the metal foil 21 is not exposed.

When the metal foil 21 is cut at the positions of the first side S21 and the second side S22 of each element region, referring to FIG. 8B, the metal foil 21 is exposed at both of the cut surfaces.

Thus, the multilayer block body is cut at the positions of the first end and the second end of each element region, so that, at the first end surface of the resultant multilayer body element, the metal foil and the first sealing portion are exposed, and, at the second end surface, the valve metal substrate and the second sealing portion are exposed.

At the cut surfaces provided by cutting the multilayer block body at the positions of the first side and the second side of each element region, both of the metal foil and the valve metal substrate are exposed. Thus, fourth sealing portions are preferably formed so as to cover the side surfaces of the multilayer body element.

Figure 9:
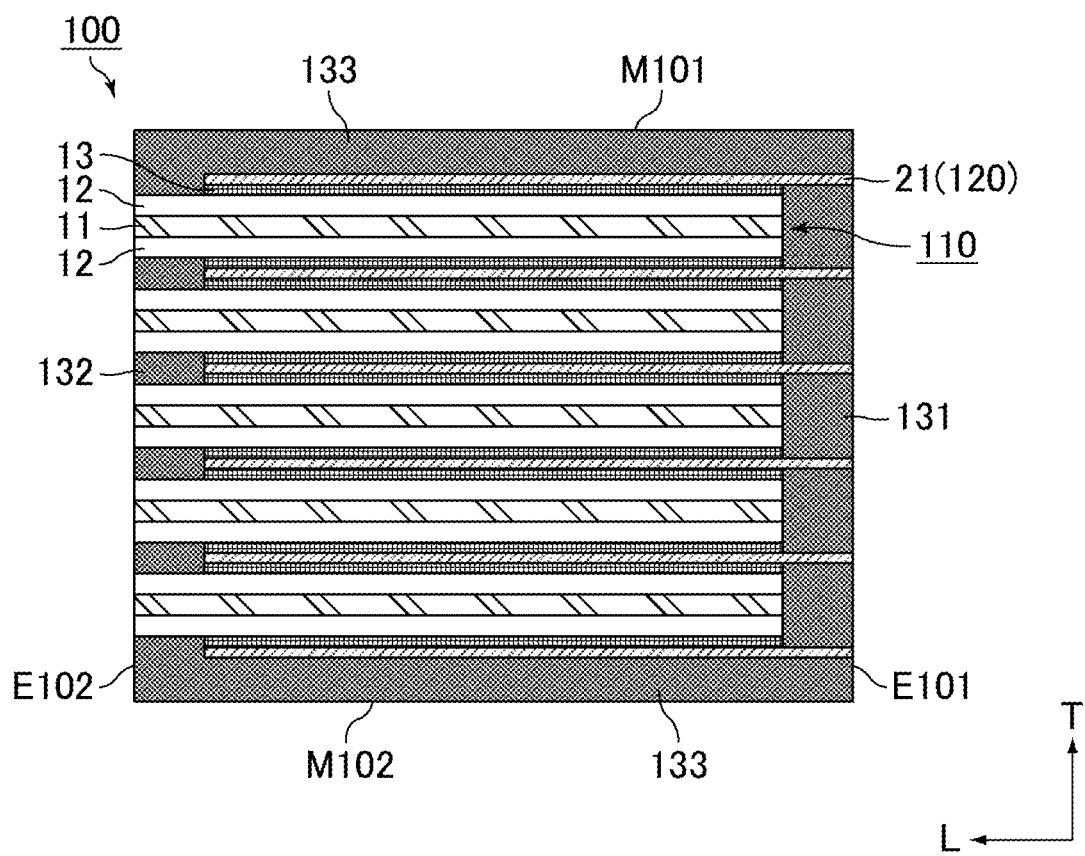
FIG. 9 is a sectional view schematically illustrating an example of a multilayer body element.
Figure 10A:
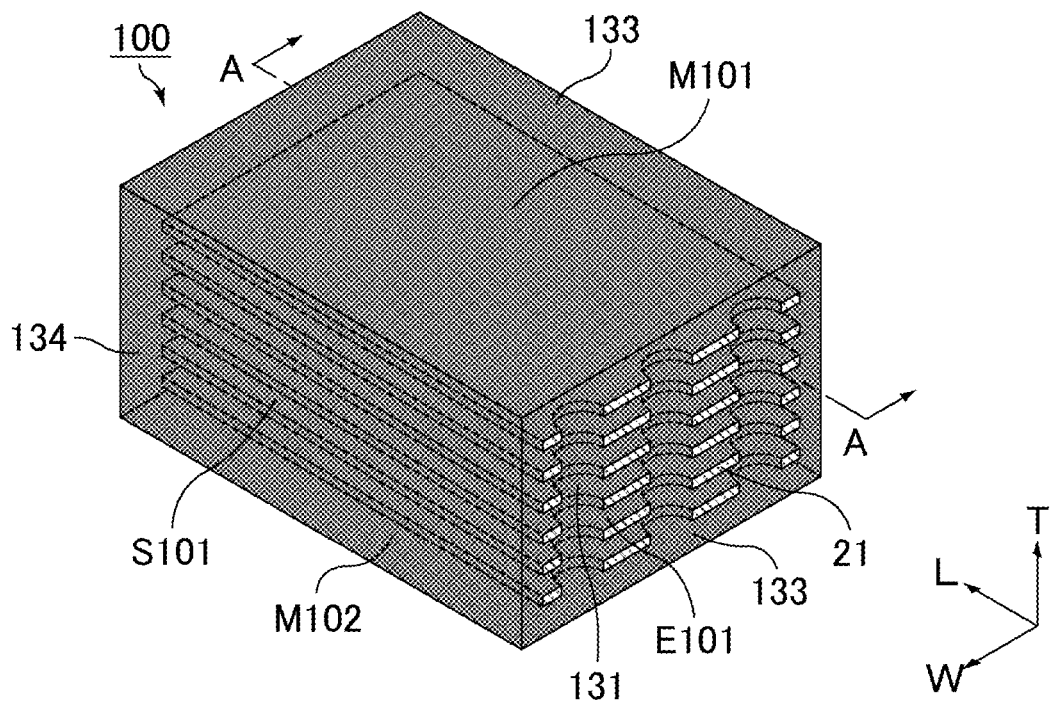
FIG. 10A and FIG. 10B are perspective views schematically illustrating an example of a multilayer body element.
Figure 10B:
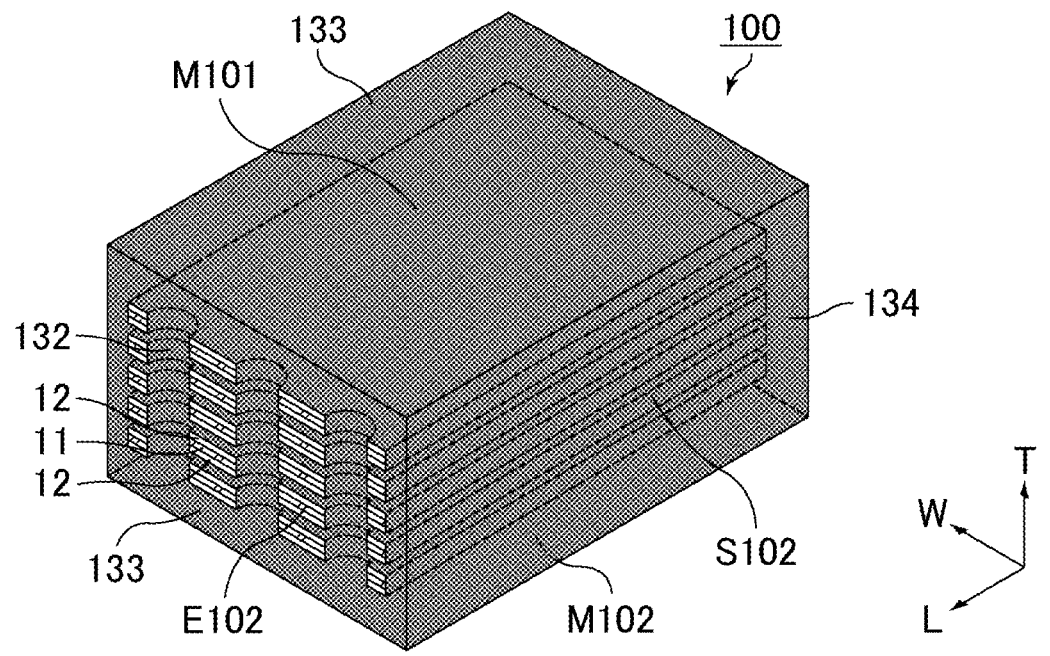

FIG. 9 is a sectional view schematically illustrating an example of the multilayer body element. FIG. 10A and FIG. 10B are perspective views schematically illustrating an example of the multilayer body element. Incidentally, FIG. 9 is a sectional view taken along line A-A in the multilayer body element in FIG. 10A.

In a multilayer body element 100 in FIG. 9, FIG. 10A, and FIG. 10B, referring to FIG. 9, first layers 110 and second layers 120 formed of a metal foil 21 are laminated, the first layers 110 including a valve metal substrate 11 including, on the surfaces, porous portions (not shown), dielectric layers 12 formed on the surfaces of the porous portions, and solid electrolytic layers 13 disposed on the dielectric layers 12. The first layers 110 and the second layers 120 are alternately laminated in the lamination direction (T direction); in consideration of weatherability such as humidity resistance and heat resistance, referring to FIG. 9, second layers 120 that are metal foils are preferably disposed as outermost layers (except for the third sealing portions 133), which oppose each other in the lamination direction.

Incidentally, FIG. 9, FIG. 10A, and FIG. 10B do not illustrate the mask layer 14, the insulating adhesive layer 15, or the electric conductor layer 16.

Referring to FIG. 9, FIG. 10A, and FIG. 10B, the multilayer body element 100 has a first main surface M101 and a second main surface M102, which oppose each other in a lamination direction (T direction); a first end surface E101 and a second end surface E102, which oppose each other in a length direction (L direction) orthogonal to the lamination direction; and a first side surface S101 and a second side surface S102, which oppose each other in a width direction (W direction) orthogonal to the lamination direction and the length direction.

Referring to FIG. 9 and FIG. 10A, at the first end surface E101 of the multilayer body element 100, the metal foils 21 and the first sealing portions 131 are exposed. On the other hand, referring to FIG. 9 and FIG. 10B, at the second end surface E102 of the multilayer body element 100, the valve metal substrates 11 and the second sealing portions 132 are exposed. Incidentally, at the second end surface E102 of the multilayer body element 100, the dielectric layers 12 are also exposed; however, in the following description, the structure of the second end surface E102 will be simply described as "the valve metal substrate 11 and the second sealing portion 132 are exposed".

The multilayer body element 100 further includes the third sealing portions 133 covering the main surfaces, and fourth sealing portions 134 covering the side surfaces.

The multilayer body element is preferably produced in the following manner.

The multilayer block body is first cut along the first side and the second side of each element region. The multilayer block body is cut with, for example, a dicing machine such as a dicer.

Figure 11A:
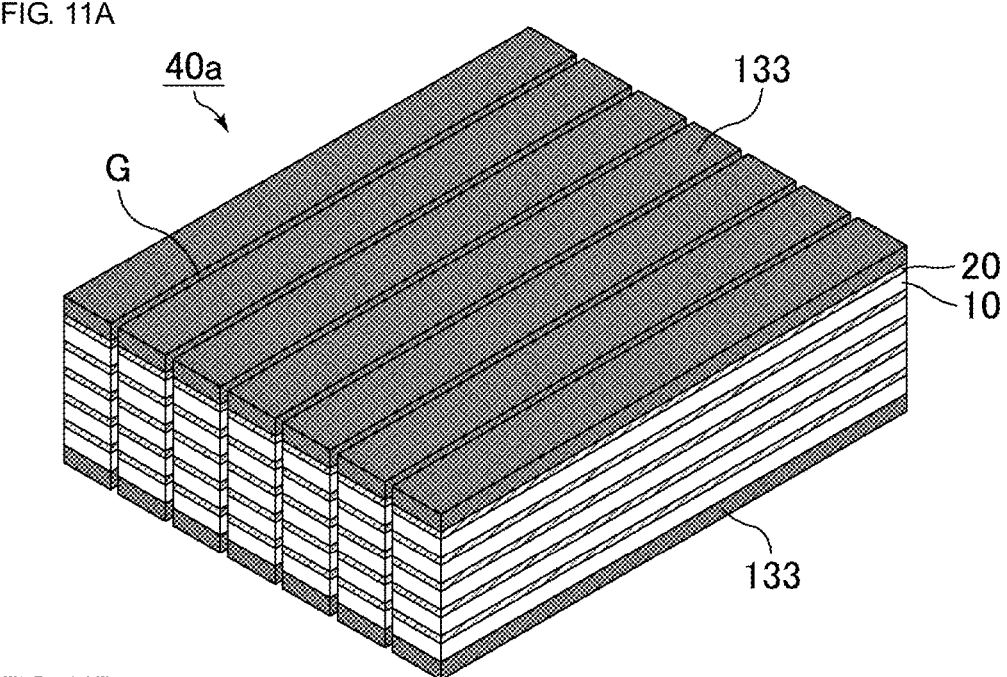
FIG. 11A is a perspective view schematically illustrating an example of a multilayer block body having been cut.
Figure 11B:
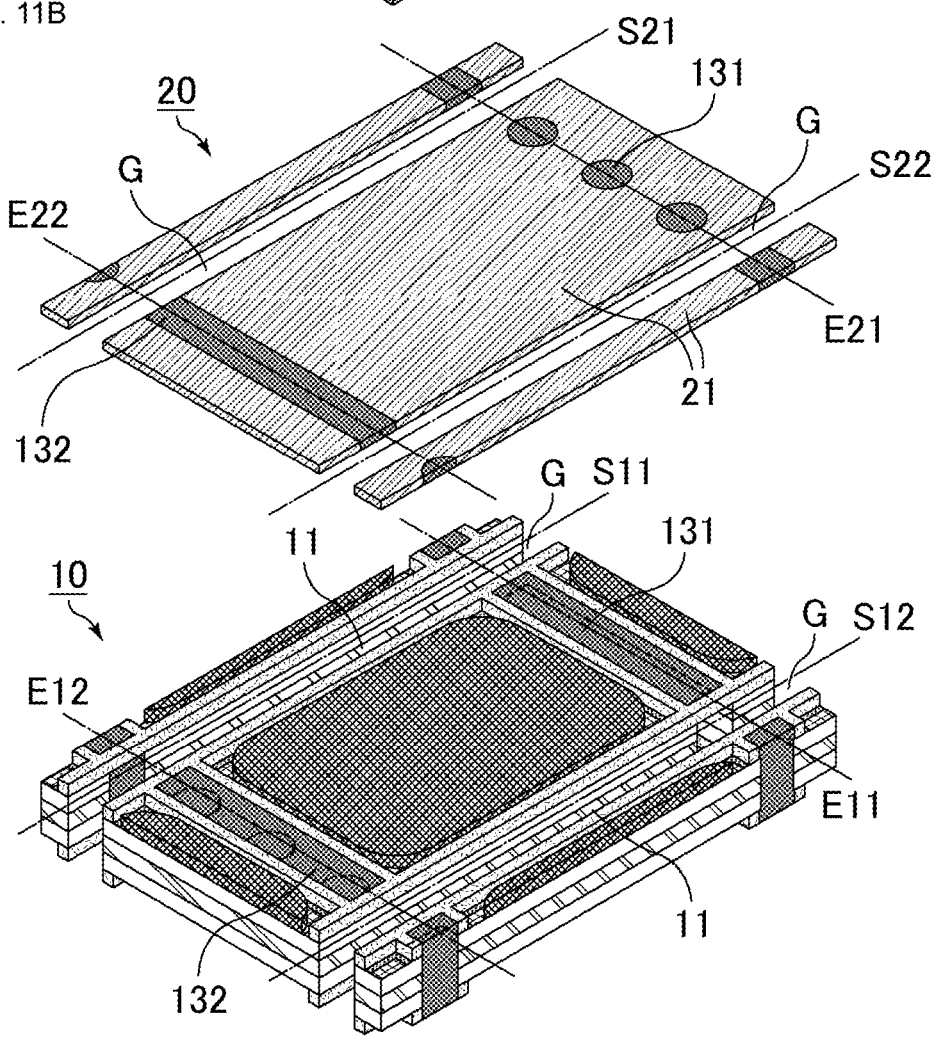
FIG. 11B is an enlarged exploded perspective view of a portion in FIG. 11A.

FIG. 11A is a perspective view schematically illustrating an example of a multilayer block body having been cut. FIG. 11B is an enlarged exploded perspective view of a portion in FIG. 11A.

For example, the multilayer block body 40 in FIG. 6A is cut along the first side and the second side of each element region, to thereby produce, referring to FIG. 11A and FIG. 11B, a multilayer block body 40a in which gaps G are formed along the first side and the second side. In the multilayer block body 40a, referring to FIG. 11B, at the cut side surfaces provided by the cutting, the metal foil 21 and the valve metal substrate 11 are exposed. Incidentally, exposed portions of the metal foil 21 and the valve metal substrate 11 have thicknesses (thicknesses in T direction) larger than the thicknesses of the unexposed internal portions of the metal foil 21 and the valve metal substrate 11, and the metal foil 21 and the valve metal substrate 11 thicken in a tapering shape in the thickness direction and also in its opposite direction, which is not illustrated.

Subsequently, the gaps formed in the multilayer block body are filled with a sealing material. This forms the fourth sealing portions filling the gaps. The sealing material is, for example, the sealing material for forming the first sealing portion and the second sealing portion.

Figure 12A:
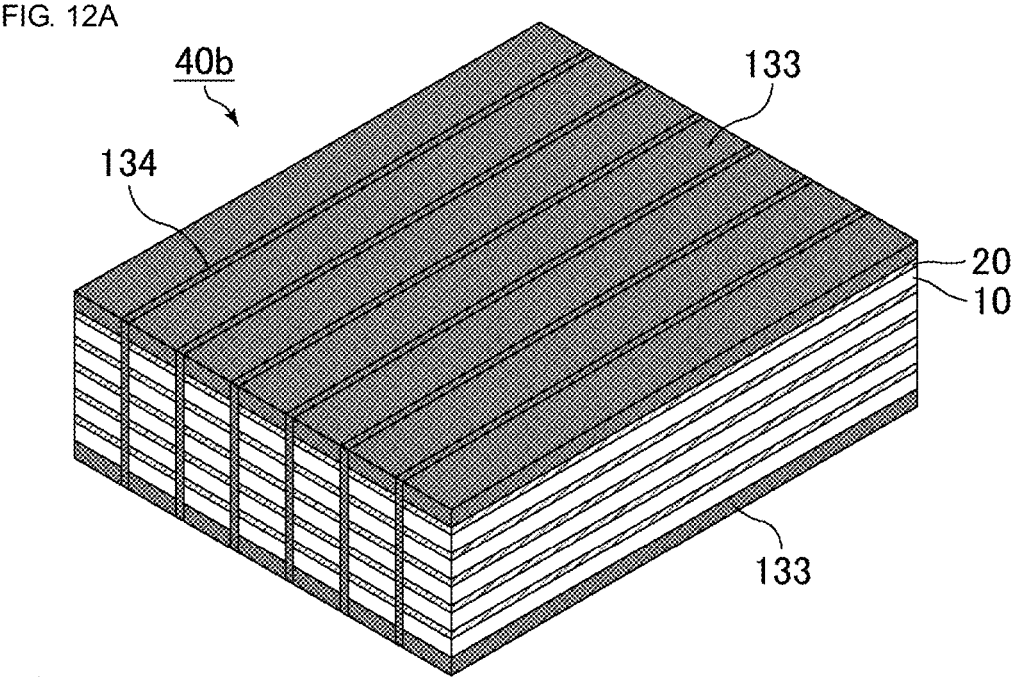
FIG. 12A is a perspective view schematically illustrating an example of a multilayer block body in which a fourth sealing portion is formed.
Figure 12B:
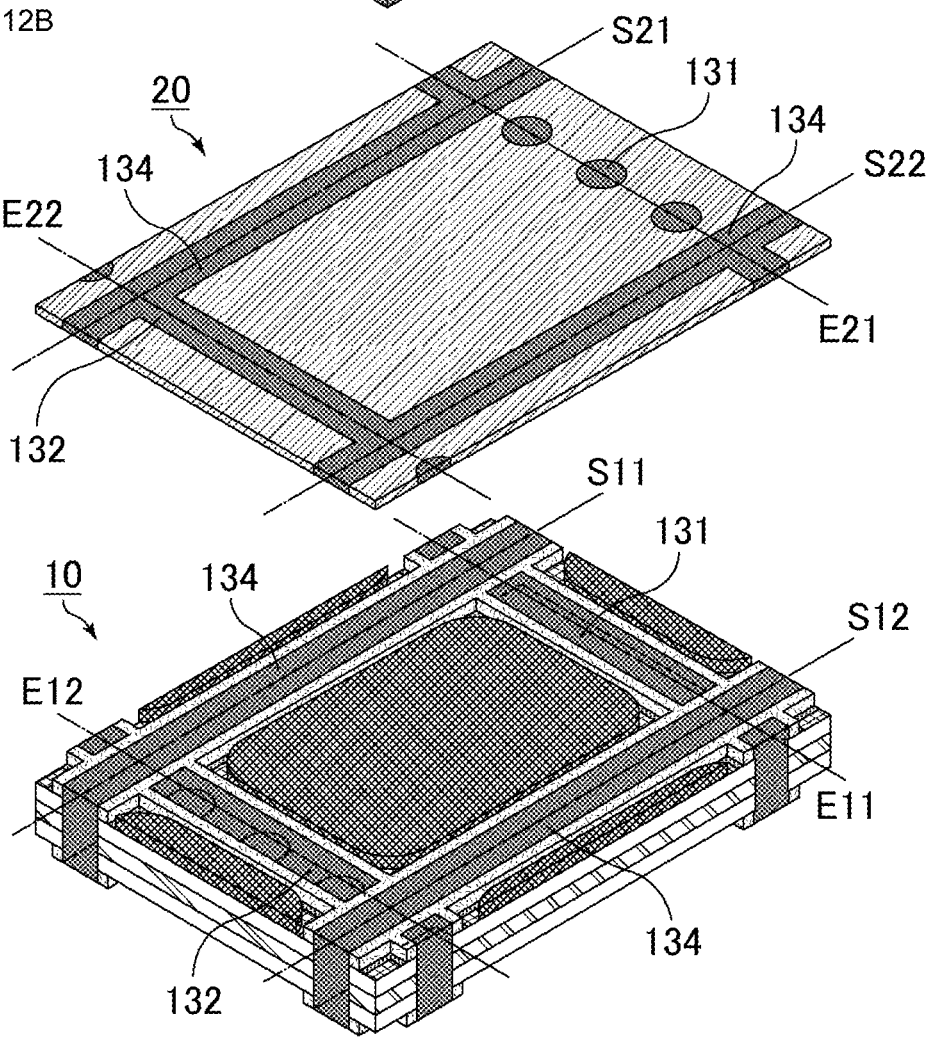
FIG. 12B is an enlarged exploded perspective view of a portion in FIG. 12A.

FIG. 12A is a perspective view schematically illustrating an example of the multilayer block body provided with the fourth sealing portions. FIG. 12B is an enlarged exploded perspective view of a portion in FIG. 12A.

The gaps G in the multilayer block body 40a in FIG. 11A are filled with the sealing material, to thereby produce, referring to FIG. 12A and FIG. 12B, a multilayer block body 40b in which the fourth sealing portions 134 are formed so as to fill the gaps G.

Subsequently, the multilayer block body is cut at the positions of the first end and the second end of each element region such that the first sealing portion 131 and the second sealing portion 132 are each divided to both sides, and is also cut at the positions of the first side and the second side of each element region such that the fourth sealing portions 134 are each divided to both sides. This enables division into multilayer body elements whose first side and second side are insulated by the sealing portions. The multilayer block body is cut by, for example, using a dicing machine such as a dicer, using a cutting blade, laser processing, or scribing. Incidentally, when the first sheets and the second sheets are laminated on a substrate formed of, for example, glass epoxy resin, in order to cut, with certainty, the second sheets that are metal foils, the cutting is preferably performed to the point of half of the thickness of the substrate. Incidentally, this cutting to the point of half of the thickness of the substrate causes generation of stepped structures extending from the first side and the second side of each element region to the substrate; and these stepped structures are buried with portions of the fourth sealing portions 134.

Figure 13A:
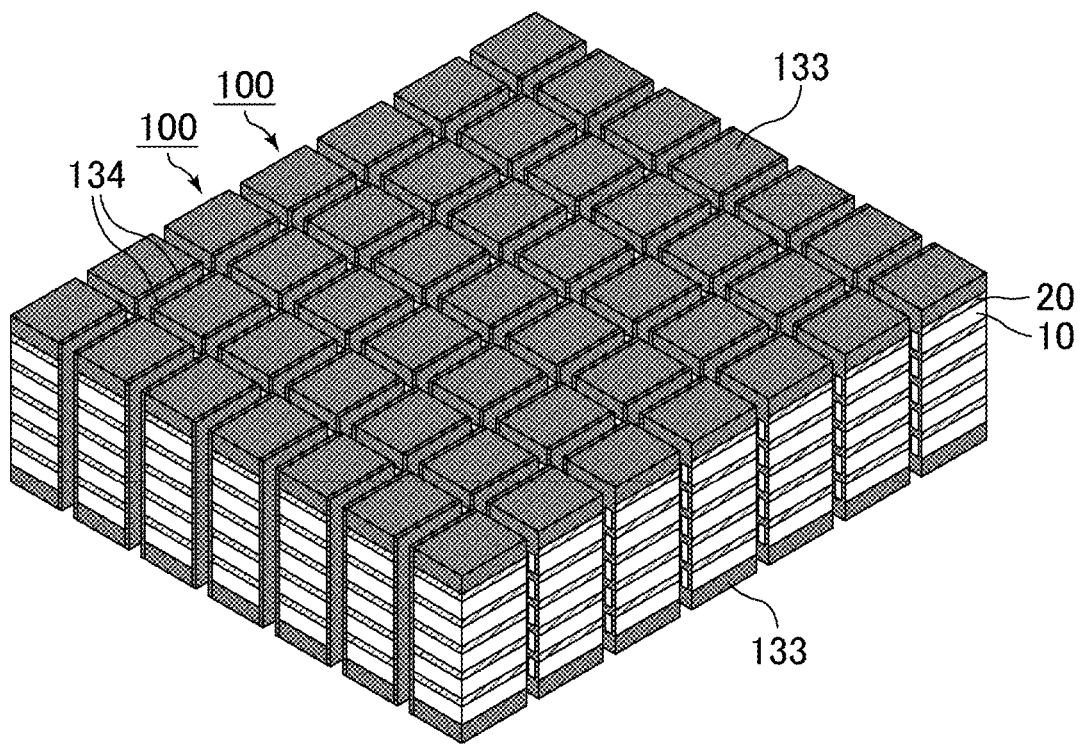
FIG. 13A is a perspective view schematically illustrating an example of multilayer body elements having been divided.
Figure 13B:
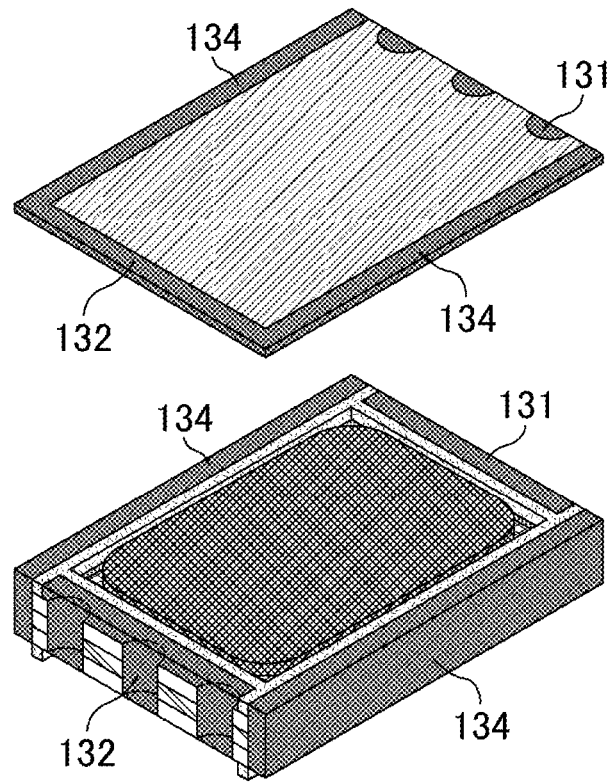
FIG. 13B is an enlarged exploded perspective view of a portion in FIG. 13A.

FIG. 13A is a perspective view schematically illustrating an example of multilayer body elements having been divided. FIG. 13B is an enlarged exploded perspective view of a portion in FIG. 13A.

The multilayer block body 40b in FIG. 12A is cut at the positions of the first end and the second end of each element region, and also cut at the positions of the first side and the second side of each element region, to thereby provide the multilayer body elements 100 in FIG. 13A. At this time, referring to FIG. 13A and FIG. 13B, the multilayer block body 40b is cut such that the cut side surfaces provided by cutting at the positions of the first side and the second side are constituted by the fourth sealing portions 134.

(H) Step of Forming First Outer Electrode and Second Outer Electrode

In the resultant multilayer body element, a first outer electrode is formed on the first end surface, and a second outer electrode is formed on the second end surface. This provides a solid electrolytic capacitor.

Figure 14:
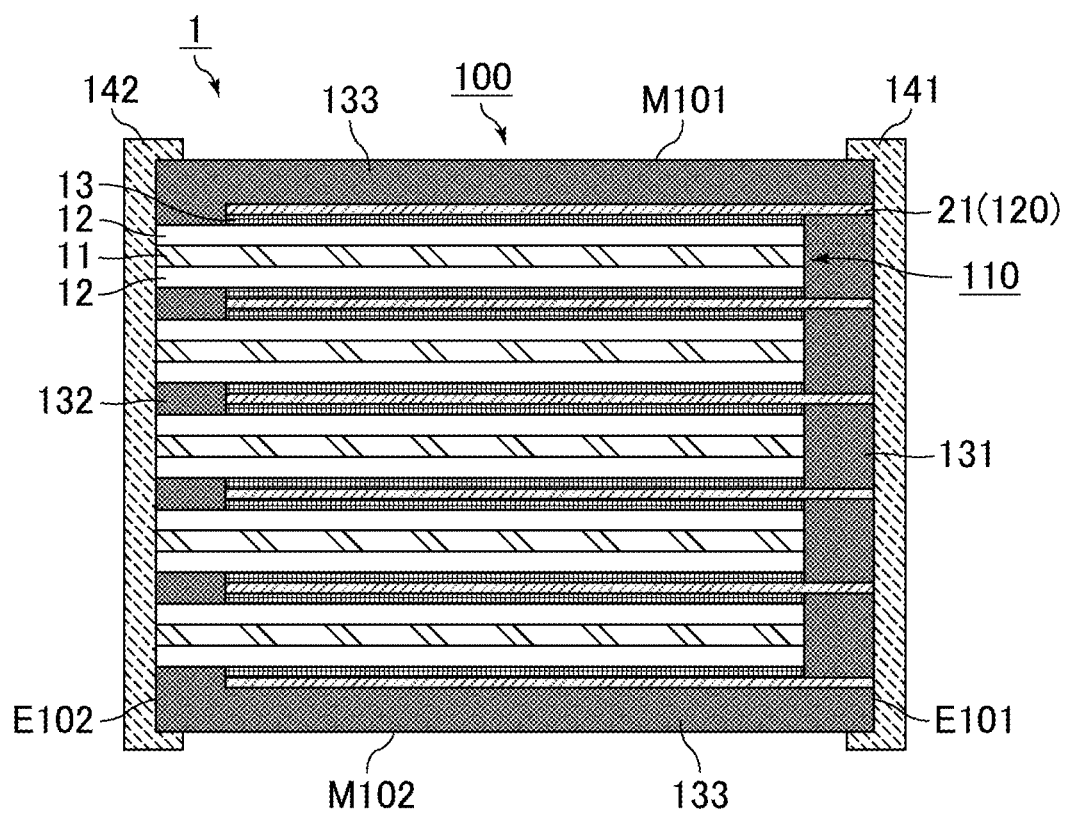
FIG. 14 is a sectional view schematically illustrating an example of a solid electrolytic capacitor.

FIG. 14 is a sectional view schematically illustrating an example of the solid electrolytic capacitor.

A solid electrolytic capacitor 1 in FIG. 14 includes the multilayer body element 100 in FIG. 9, a first outer electrode 141 formed on the first end surface E101 of the multilayer body element 100, and a second outer electrode 142 formed on the second end surface E102 of the multilayer body element 100. The first outer electrode 141 is connected to the metal foils 21 exposed at the first end surface E101, and the second outer electrode 142 is connected to the valve metal substrates 11 exposed at the second end surface E102.

The first outer electrode and the second outer electrode may be formed by, for example, plating, sputtering, dip coating, or printing. In the case of plating, examples of the plating layer include a Zn—Ag—Ni layer, a Ag—Ni layer, a Ni layer, a Zn—Ni—Au layer, a Ni—Au layer, a Zn—Ni—Cu layer, and a Ni—Cu layer. On such a plating layer, plating layers are preferably further formed in the following order: for example, a Cu plating layer, a Ni plating layer, and a Sn plating layer (or one or more layers may be omitted).

In the method for producing a solid electrolytic capacitor according to the first embodiment of the present invention, the multilayer block body may be cut and divided into multilayer body elements such that the valve metal substrate serving as an anode portion and the metal foil serving as a cathode portion are exposed at the end surfaces of each multilayer body element. This eliminates the necessity of performing the step of polishing the end surfaces for exposing the valve metal substrate and the metal foil. This enables efficient production of solid electrolytic capacitors.

Solid Electrolytic Capacitor

A solid electrolytic capacitor produced by the above-described production method also falls within the scope of the present invention.

A solid electrolytic capacitor according to an embodiment of the present invention includes a multilayer body element in which a first layer and a second layer are laminated, a first outer electrode disposed on a first end surface of the multilayer body element, and a second outer electrode disposed on a second end surface of the multilayer body element.

The first layer of the multilayer body element includes a valve metal substrate including, on a surface, a dielectric layer, and a solid electrolytic layer disposed on the dielectric layer; and the second layer is formed of a metal foil. In the multilayer body element, at the first end surface, the metal foil and the first sealing portion are exposed; and, at the second end surface, the valve metal substrate and the second sealing portion are exposed. The first outer electrode is connected to the metal foil exposed at the first end surface. The second outer electrode is connected to the valve metal substrate exposed at the second end surface.

The basic configurations of the multilayer body element, the first outer electrode, and the second outer electrode are the same as in the description in the section "Method for producing solid electrolytic capacitor", and hence the detailed descriptions thereof will not be repeated.

In a solid electrolytic capacitor according to an embodiment of the present invention, in the width direction, a sum A1 of, in a single layer, distances of exposure of the metal foil at the first end surface is smaller than a maximum width B1 of the metal foil; and a sum A2 of, in a single layer, distances of exposure of the valve metal substrate at the second end surface is smaller than a maximum width B2 of the valve metal substrate.

Figure 15A:
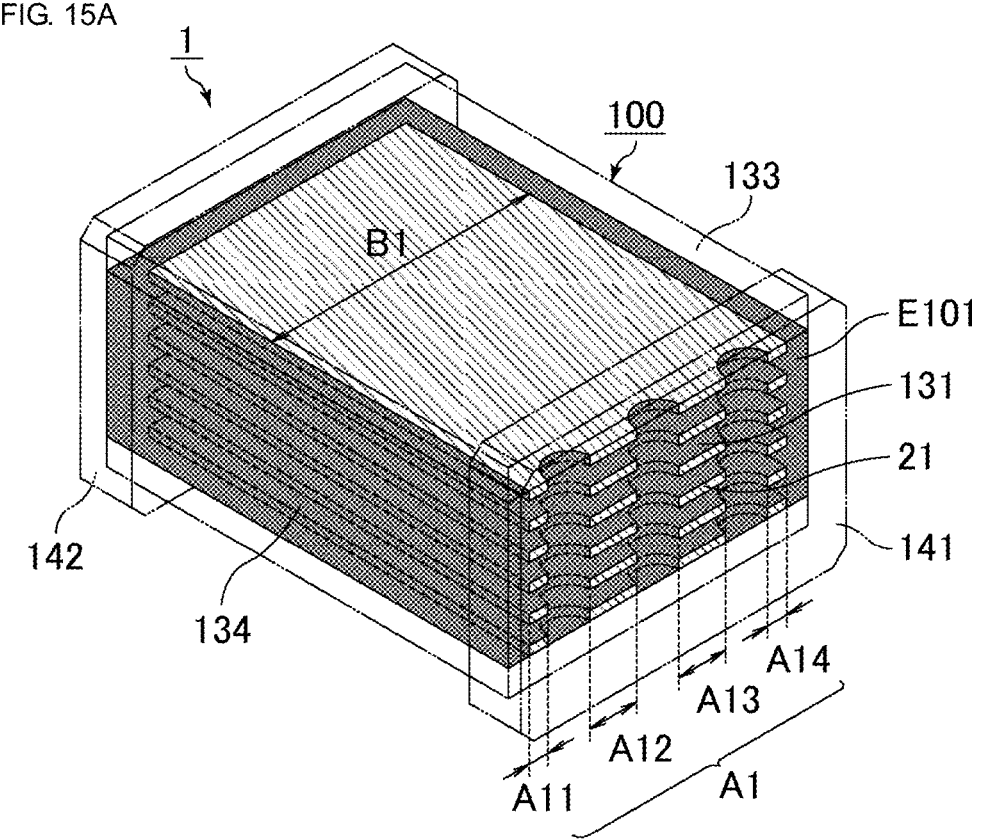
FIG. 15A and FIG. 15B are perspective views schematically illustrating characteristic parts of a solid electrolytic capacitor according to an embodiment of the present invention.
Figure 15B:
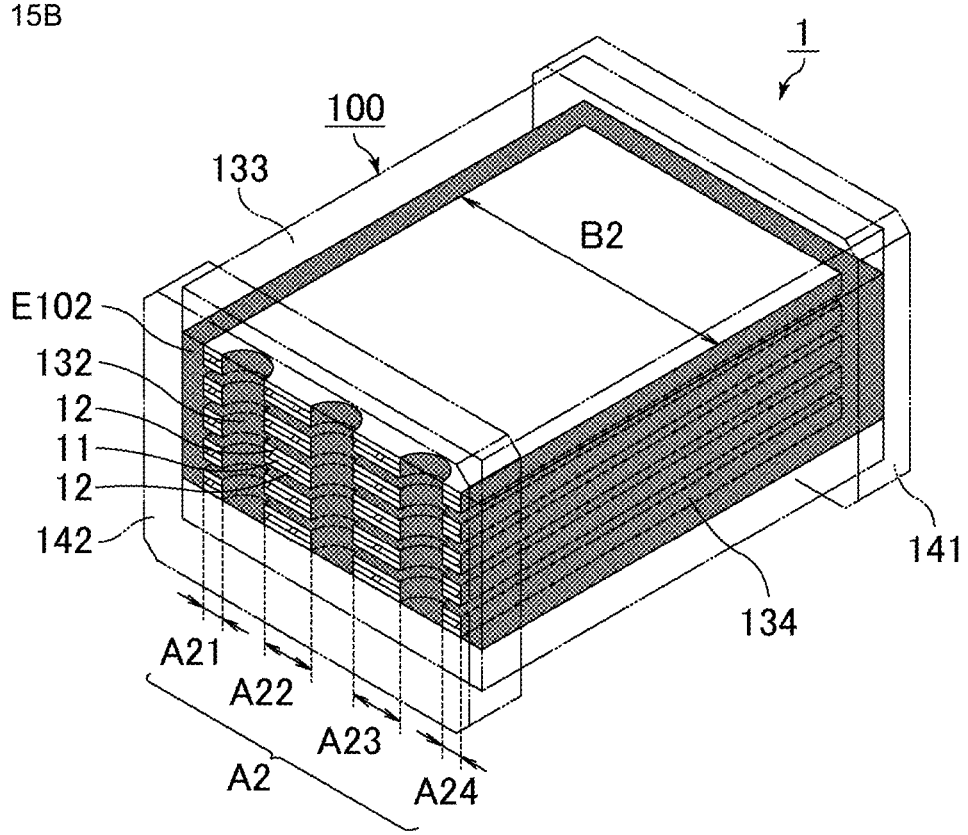

FIG. 15A and FIG. 15B are perspective views schematically illustrating characteristic parts of a solid electrolytic capacitor according to an embodiment of the present invention.

Referring to FIG. 15A and FIG. 15B, the solid electrolytic capacitor 1 includes the multilayer body element 100 in FIG. 10A and FIG. 10B, the first outer electrode 141, and the second outer electrode 142. Incidentally, in FIG. 15A and FIG. 15B, some parts of the multilayer body element 100, the first outer electrode 141, and the second outer electrode 142 are illustrated with broken lines. In addition, as in FIG. 10A and FIG. 10B, the mask layer 14, the insulating adhesive layer 15, and the electric conductor layer 16 are not illustrated.

Referring to FIG. 15A, at the first end surface E101 of the multilayer body element 100, the metal foils 21 and the first sealing portions 131 are exposed. In the width direction, the sum A1 of, in a single layer, distances A11, A12, A13, and A14 of exposure of the metal foil 21 at the first end surface E101 is smaller than the maximum width B1 of the metal foil 21.

On the other hand, referring to FIG. 15B, at the second end surface E102 of the multilayer body element 100, the valve metal substrates 11 and the second sealing portions 132 are exposed. In the width direction, the sum A2 of, in a single layer, distances A21, A22, A23, and A24 of exposure of the valve metal substrate 11 at the second end surface E102 is smaller than the maximum width B2 of the valve metal substrate 11.

Figure 16:
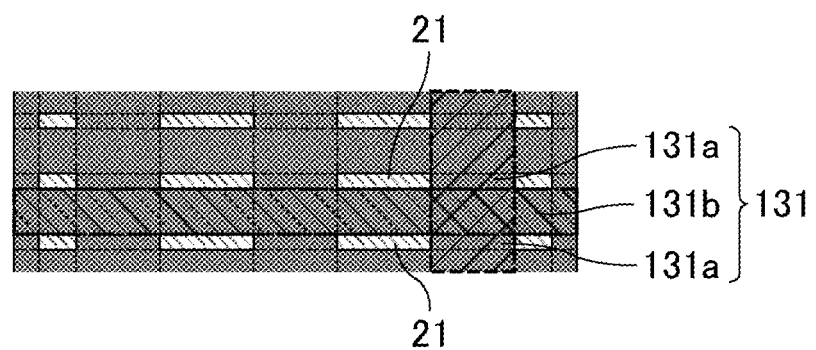
FIG. 16 is an enlarged plan view of a first end surface of a multilayer body element constituting a solid electrolytic capacitor according to an embodiment of the present invention.

FIG. 16 is an enlarged plan view of a first end surface of a multilayer body element constituting a solid electrolytic capacitor according to an embodiment of the present invention.

At the first end surface E101, the first sealing portion 131 includes first columnar portions 131a, which extend through the metal foils 21 in the lamination direction; and a first strip portion 131b, which is disposed between the metal foils 21, and connects together the first columnar portions 131a.

Figure 17:
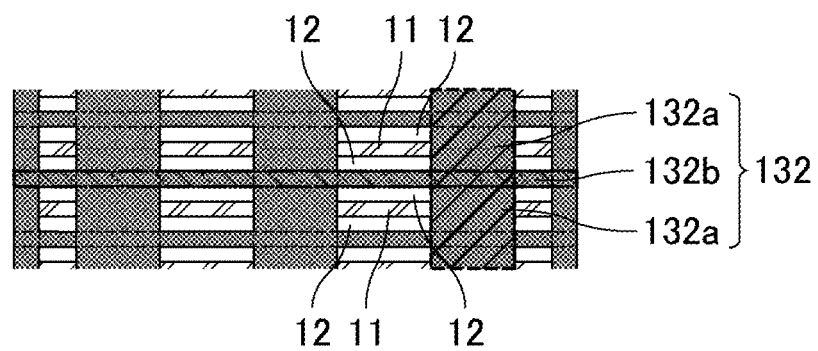
FIG. 17 is an enlarged plan view of a second end surface of a multilayer body element constituting a solid electrolytic capacitor according to an embodiment of the present invention.

FIG. 17 is an enlarged plan view of the second end surface of the multilayer body element constituting a solid electrolytic capacitor according to an embodiment of the present invention.

At the second end surface E102, the second sealing portion 132 includes second columnar portions 132a, which extend through the valve metal substrates 11 in the lamination direction; and a second strip portion 132b, which is disposed between the valve metal substrates 11, and connects together the second columnar portions 132a.

A solid electrolytic capacitor according to an embodiment of the present invention is produced by the above-described method in the section "Method for producing solid electrolytic capacitor". Thus, in the first sealing portion 131, the first strip portion 131b is derived from the sealing material filling the first through-hole, and the first columnar portions 131a are derived from the sealing material filling the third through-holes. Similarly, in the second sealing portion 132, the second columnar portions 132a are derived from the sealing material filling the second through-holes, and the second strip portion 132b is derived from the sealing material filling the fourth through-hole. In consideration of the filling capability of the sealing material, the larger the widths of the first columnar portions 131a and the second columnar portions 132a, the more preferable it is; however, this causes a decrease in the ratios of the metal foil and the valve metal substrate exposed at the end surfaces, which results in an increase in ESR.

For this reason, in a solid electrolytic capacitor according to an embodiment of the present invention, the value of A1/B1 is preferably 0.1 or more and 0.9 or less, more preferably 0.5 or more. The value of A2/B2 is preferably 0.1 or more and 0.9 or less, more preferably 0.5 or more.

Incidentally, the value of A1 and the value of A2 may be the same or different. Similarly, the value of B1 and the value of B2 may be the same or different. Thus, the value of A1/B1 and the value of A2/B2 may be the same or different.

In a solid electrolytic capacitor according to an embodiment of the present invention, the first sealing portion and the second sealing portion are formed by filling the through-holes with a sealing material. Thus, the first columnar portions and the first strip portion are preferably formed in one piece, and the second columnar portions and the second strip portion are preferably formed in one piece. Incidentally, "formed in one piece" means the absence of an interface at the boundary between the portions.

In consideration of the filling capability of the sealing material during formation of the first sealing portion and the second sealing portion, two or more first columnar portions and two or more second columnar portions are preferably formed in the width direction at the end surfaces. In this case, the first columnar portions and the second columnar portions are each preferably linearly formed in a direction from the first main surface to the second main surface of the multilayer body element.

The width of each columnar portion is not particularly limited, but the ratio of the width to the maximum width of the metal foil or the valve metal substrate is preferably 10% or more and 70% or less. For example, when the metal foil or the valve metal substrate has a maximum width of 3 mm, three columnar portions having a width of 0.5 mm are preferably disposed. In this case, the distance between the columnar portions is preferably 0.35 mm.

When two or more first columnar portions and two or more second columnar portions are formed, in consideration of the filling capability of the sealing material, these columnar portions are preferably formed at equal intervals. Incidentally, "at equal intervals" does not necessarily mean that the widths of strip portions positioned between columnar portions are strictly the same, and the widths may have deviations of about 3% or less.

The width of a strip portion positioned between columnar portions is not particularly limited, but the ratio of the width to the maximum width of the metal foil or the valve metal substrate is preferably 10% or more and 70% or less.

The width of a strip portion not positioned between columnar portions is preferably similar to the width of a strip portion positioned between columnar portions.

As described in the section "Method for producing solid electrolytic capacitor", in addition to the first sealing portion and the second sealing portion, the third sealing portion may be simultaneously formed. Thus, in a solid electrolytic capacitor according to an embodiment of the present invention, the third sealing portion covering at least one of the main surfaces of the multilayer body element is preferably formed in one piece together with the first sealing portion and the second sealing portion.

In the solid electrolytic capacitor according to the first embodiment of the present invention, the valve metal substrate and the metal foil are connected to each other with another electric conductor layer (disposed on the solid electrolytic layer) therebetween. In this case, the valve metal substrate and the metal foil may be connected to each other with an electroconductive adhesive layer (disposed on the electric conductor layer) therebetween. The electric conductor layer may be constituted by a carbon layer alone, or a silver layer alone, or may be constituted by two layers that are a carbon layer serving as an underlying layer, and a silver layer serving as an overlying layer.

In particular, preferably, as the electric conductor layer, a carbon layer is disposed on the solid electrolytic layer, and the surface of the metal foil is in direct contact with the carbon layer, more preferably, the surface of a carbon-coated metal foil is preferably in direct contact with the carbon layer.

For portions not provided with the solid electrolytic layer, the electric conductor layer, or the electroconductive adhesive layer, the valve metal substrate and the metal foil are preferably connected to each other with an insulating adhesive layer therebetween.

Second Embodiment

A method for producing a solid electrolytic capacitor according to a second embodiment of the present invention is the same as in the first embodiment in terms of the step (A), the step (B), the step (E), and the step (F); however, the step (C) and the step (D) are not performed. In the second embodiment, the step (F) described in the first embodiment is optionally performed. In the second embodiment, instead of the step (G) and the step (H) described in the first embodiment, a step (G') and a step (H') are performed.

In the second embodiment, since the step (C) is not performed, the first end and the second end, and the first side and the second side of each element region of the first sheet are not covered with an insulating material. In other words, the mask layer and the insulating adhesive layer described in the first embodiment are not formed.

In addition, since the step (D) is not performed, the electric conductor layer is not formed on the solid electrolytic layer of the first sheet.

Except for the above-described points, the step (A), the step (B), and the step (E) are performed as in the first embodiment, so that the first sheet and the second sheet are prepared, and these sheets are laminated to produce a laminated sheet. In the second embodiment, during lamination of the first sheet and the second sheet, the valve metal substrate and the metal foil may be connected to each other with the solid electrolytic layer therebetween, or the valve metal substrate and the metal foil may be connected to each other with an electroconductive adhesive layer (disposed on the solid electrolytic layer) therebetween.

As described above, in the second embodiment, the step (F) is optionally performed. In other words, in the second embodiment, the multilayer block body is optionally produced as needed.

In the step (G'), in the case of not producing the multilayer block body, the laminated sheet is cut; in the other case of producing the multilayer block body, the multilayer block body is cut, to produce a plurality of multilayer body elements. When the laminated sheet is cut, after the cutting, appropriate portions of the end surfaces of multilayer body elements may be provided with a sealing material.

In the first embodiment, the multilayer block body is cut twice along the first side and the second side of each element region, to simultaneously produce multilayer body elements having the fourth sealing portions. On the other hand, in the second embodiment, the laminated sheet or the multilayer block body may be cut twice along the first side and the second side of each element region, to simultaneously produce multilayer body elements having the fourth sealing portions; or the laminated sheet or the multilayer block body may be cut at the positions of the first side and the second side of each element region, and then the resultant cut side surfaces may be coated with a sealing material to form the fourth sealing portions.

In the step (H'), in the resultant multilayer body element, a first outer electrode and a second outer electrode are formed. In the second embodiment, the method of forming the first outer electrode and the second outer electrode in the multilayer body element is not limited to the method described in the first embodiment. For example, the first outer electrode and the second outer electrode may be resin electrodes containing Ag or Cu. To the first and second outer electrodes, lead terminals may be connected.

Thus, a solid electrolytic capacitor is produced.

The method for producing a solid electrolytic capacitor according to the second embodiment of the present invention also enables, as in the first embodiment, efficient production of solid electrolytic capacitors.

The solid electrolytic capacitors produced by the above-described production method also fall within the scope of the present invention.

In the solid electrolytic capacitor according to the second embodiment of the present invention, the valve metal substrate and the metal foil may be connected to each other with the solid electrolytic layer therebetween, or may be connected to each other with an electroconductive adhesive layer (disposed on the solid electrolytic layer) therebetween.

Third Embodiment

A method for producing a solid electrolytic capacitor according to a third embodiment of the present invention is the same as in the first embodiment in terms of the step (C) and the step (D), but the step (B) is not performed. In the third embodiment, instead of the step (A), the step (E), the step (F), the step (G), and the step (H) described in the first embodiment, a step (A'), a step (E'), a step (F'), a step (G'), and a step (H') are performed. Incidentally, in the third embodiment, the step (F') is optionally performed.

In the step (A'), a first sheet different from that in the first embodiment is prepared. The first sheet includes a valve metal substrate including, on a surface, a dielectric layer, and a solid electrolytic layer disposed on the dielectric layer. The first sheet further includes a plurality of element regions. In the first sheet, each element region is defined by a first end and a second end, which oppose each other in a length direction, and by a first side and a second side, which oppose each other in a width direction orthogonal to the length direction. In the first sheet, a first through-hole is formed so as to extend across the first end of each element region, and have a width equal to or larger than the width of the element region.

Figure 18A:
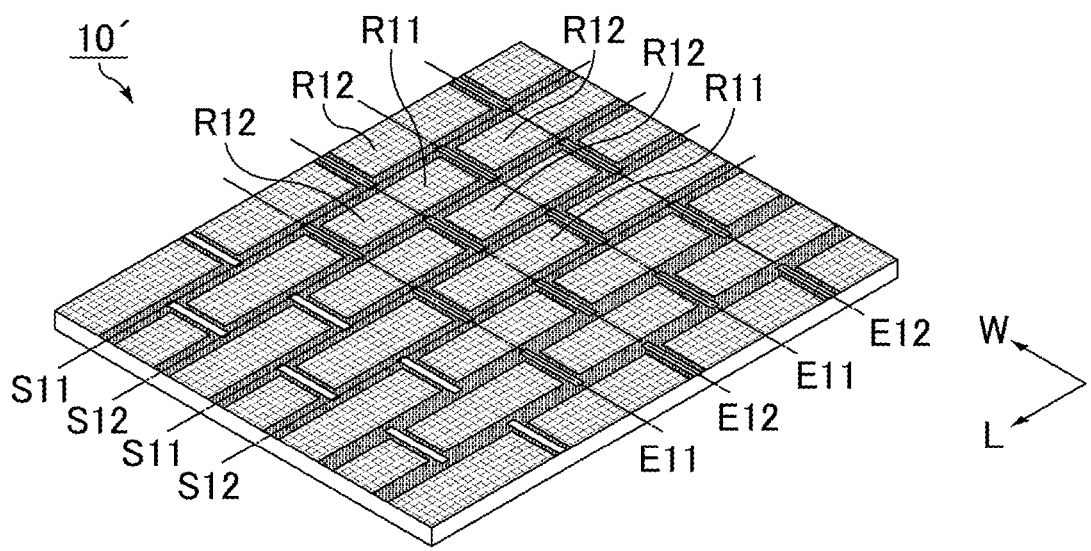
FIG. 18A is a perspective view schematically illustrating another example of a first sheet.
Figure 18B:
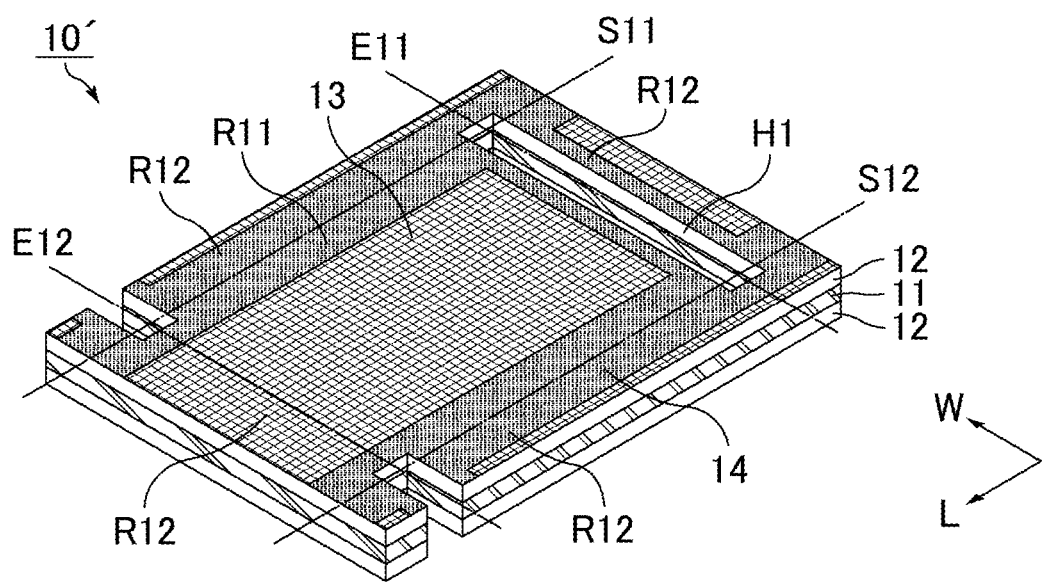
FIG. 18B is an enlarged perspective view of a portion in FIG. 18A.

FIG. 18A is a perspective view schematically illustrating another example of the first sheet. FIG. 18B is an enlarged perspective view of a portion in FIG. 18A.

Unlike the first sheet 10 in FIG. 1A and FIG. 1B, a first sheet 10' in FIG. 18A and FIG. 18B does not have the second through-holes H2. In addition, the solid electrolytic layer 13 extends to the cathode-side second end E12; thus, the solid electrolytic layer 13 is shared by the element region and an adjacent element region in the length direction. Except for these points, the first sheet 10' in FIG. 18A and FIG. 18B has the same configuration as in the first sheet 10 in FIG. 1A and FIG. 1B. Thus, the detailed descriptions will not be repeated.

On the other hand, since the step (B) is not performed, the second sheet described in the first embodiment is not prepared.

In the step (E'), such first sheets are laminated such that the first ends of corresponding element regions of the sheets face each other and the second ends of corresponding element regions of the sheets face each other, to thereby produce a laminated sheet.

When the first sheets are laminated, the valve metal substrates are connected to each other with another electric conductor layer (disposed on the solid electrolytic layer) therebetween. In this case, the valve metal substrates may be connected to each other with an electroconductive adhesive layer (disposed on the electric conductor layer) therebetween.

For portions not provided with the solid electrolytic layer, the electric conductor layer, or the electroconductive adhesive layer, the valve metal substrates are preferably connected to each other with an insulating adhesive layer therebetween.

Figure 19A:
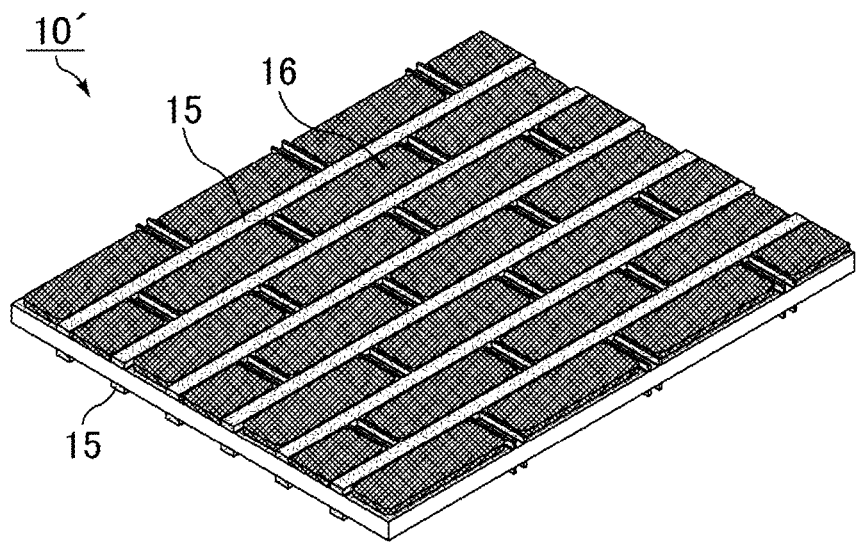
FIG. 19A is a perspective view schematically illustrating another example of a first sheet provided with an insulating adhesive layer and an electric conductor layer.
Figure 19B:
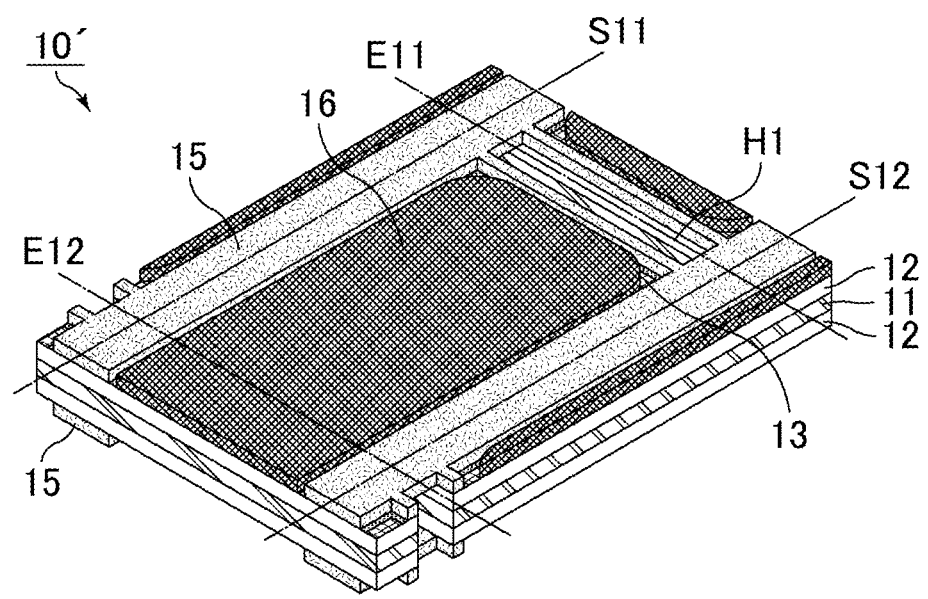
FIG. 19B is an enlarged perspective view of a portion in FIG. 19A.

FIG. 19A is a perspective view schematically illustrating another example of the first sheet provided with an insulating adhesive layer and an electric conductor layer. FIG. 19B is an enlarged perspective view of a portion in FIG. 19A. In FIG. 19A and FIG. 19B, on the mask layer 14 of the first sheet 10' in FIG. 18A and FIG. 18B, an insulating adhesive layer 15 is disposed, and an electric conductor layer 16 is disposed on the solid electrolytic layer 13. Unlike the electric conductor layer 16 in FIG. 4A and FIG. 4B, the electric conductor layer 16 is disposed to the cathode-side second end E12; and the electric conductor layer 16 is shared by the element region and an adjacent element region in the length direction.

Thus, the method for producing a solid electrolytic capacitor according to the third embodiment of the present invention includes, as in the first embodiment, the step (C) and the step (D). The step (C) and the step (D) have been described in the first embodiment, and hence the detailed descriptions thereof will not be repeated.

In the step (F'), a multilayer block body in which the first through-holes are filled with a sealing material is produced. The method for producing the multilayer block body is not particularly limited. For example, the first sheets in which the first through-holes are filled with a sealing material may be laminated to produce the multilayer block body; or, lamination of the first sheets and filling with a sealing material may be sequentially performed to produce the multilayer block body.

As described above, in the third embodiment, the step (F') is optionally performed. In other words, in the third embodiment, the multilayer block body is optionally produced as needed.

The step (G') and the step (H') are the same as in the second embodiment. Thus, a solid electrolytic capacitor is provided.

Fourth Embodiment

A method for producing a solid electrolytic capacitor according to a fourth embodiment of the present invention is the same as in the third embodiment in terms of the step (A'), the step (E'), the step (F'), and the step (H'); however, the step (C) and the step (D) are not performed. Note that, in the fourth embodiment, the step (F') described in the third embodiment is necessarily performed.

In the fourth embodiment, the multilayer block body obtained in the step (F') is subjected to the step (G) described in the first embodiment. Thus, a solid electrolytic capacitor is provided.

OTHER EMBODIMENTS

Methods for producing a solid electrolytic capacitor and solid electrolytic capacitors according to the present invention are not limited to the above-described embodiments. For example, the configurations and production conditions of solid electrolytic capacitors can be changed or modified in various ways without departing from the spirit and scope of the present invention.

For methods for producing a solid electrolytic capacitor according to the present invention, in the first embodiment and the second embodiment, the first sheets having the first through-hole and the second through-holes, and the second sheets having the third through-holes and the fourth through-hole are laminated to produce the laminated sheet; and, in the third embodiment and the fourth embodiment, the first sheets having the first through-hole are laminated to produce the laminated sheet.

However, in methods for producing a solid electrolytic capacitor according to the present invention, the method of producing the laminated sheet is not particularly limited. For example, first sheets having the first through-hole, and second sheets having the fourth through-hole may be laminated to produce the laminated sheet; or, first sheets having the first through-hole and the second through-hole may be laminated to produce the laminated sheet.

In methods for producing a solid electrolytic capacitor according to some embodiments of the present invention, a multilayer block body having through-holes filled with a sealing material is optionally produced as needed. In the case of not producing the multilayer block body, the laminated sheet is cut; in the other case of producing the multilayer block body, the multilayer block body is cut, to produce a plurality of multilayer body elements. When the laminated sheet is cut, after the cutting, appropriate portions of the end surfaces of the multilayer body elements may be provided with a sealing material.

In methods for producing a solid electrolytic capacitor according to the present invention, the method of cutting the laminated sheet or the multilayer block body, and the method of forming the first outer electrode and the second outer electrode on the multilayer body element are not particularly limited.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A solid electrolytic capacitor comprising:
   a multilayer body element having a number of first layers that are laminated together, the first layers including a valve metal substrate having, on a surface thereof, a dielectric layer, and a solid electrolytic layer disposed on the dielectric layer, the multilayer body element having first and second main surfaces that oppose each other in a lamination direction, first and second side surface that oppose each other in a width direction, and first and second end surfaces that oppose each other in a length direction;
   a sealing portion covering the first and the second main surfaces that oppose each other in the lamination direction and the first and the second side surfaces that oppose each other in the width direction;
   a first outer electrode on the first end surface of the multilayer body element and electrically connected to a metal foil; and
   a second outer electrode on the second end surface of the multilayer body element and electrically connected to the valve metal substrate, wherein
   in the first layers, a cutting region is formed at an end of the multilayer body element on a side of the second end surface and a sealing portion filled with a sealing material in the cutting region is exposed at the second end surface, wherein the cutting region extends through the valve metal substrate in the lamination direction at the second end surface of the multilayer body element such that the sealing material is between portions of an end surface of the valve metal substrate and the second outer electrode in the width direction.

2. The solid electrolytic capacitor according to claim 1, wherein a sum A2 of, in a single first layer, distances of exposure of the valve metal substrate at the second end surface is smaller than a maximum width B2 of the valve metal substrate in a width direction of the multilayer body element.

3. The solid electrolytic capacitor according to claim 2, wherein a value of A2/B2 is 0.5 or more.

4. The solid electrolytic capacitor according to claim 1, wherein the sealing portion includes a columnar portion extending through the valve metal substrate in the lamination direction, and a strip portion disposed between adjacent valve metal substrates that connects together adjacent columnar portions in the second end surface of the multilayer body element.

5. The solid electrolytic capacitor according to claim 4, wherein the columnar portion includes two or more columnar portions extending in the width direction in the second end surface of the multilayer body element.

6. The solid electrolytic capacitor according to claim 4, wherein the columnar portion is linearly disposed in a direction from the first main surface to the second main surface of the multilayer body element that oppose each other in the lamination direction.

* * * * *